(12) United States Patent
Ishida et al.

(10) Patent No.: US 8,292,443 B2
(45) Date of Patent: Oct. 23, 2012

(54) MIRROR STRUCTURE

(75) Inventors: Kazuo Ishida, Hachioji (JP); Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 387 days.

(21) Appl. No.: 12/664,882

(22) PCT Filed: Jul. 6, 2009

(86) PCT No.: PCT/JP2009/062283
§ 371 (c)(1),
(2), (4) Date: Dec. 15, 2009

(87) PCT Pub. No.: WO2010/004954
PCT Pub. Date: Jan. 14, 2010

(65) Prior Publication Data
US 2010/0182709 A1    Jul. 22, 2010

(30) Foreign Application Priority Data
Jul. 7, 2008    (JP) .................. 2008-176460

(51) Int. Cl.
*G02B 5/08* (2006.01)
*G02B 5/26* (2006.01)
*A47F 1/14* (2006.01)

(52) U.S. Cl. .................. 359/883; 359/884; 248/467
(58) Field of Classification Search .................. 359/883
See application file for complete search history.

(56) References Cited

U.S. PATENT DOCUMENTS
6,252,155 B1 *   6/2001   Ortabasi .................. 136/246
2008/0105293 A1 * 5/2008 Lu et al. .................. 136/246

FOREIGN PATENT DOCUMENTS
JP          11-119105        4/1999

* cited by examiner

*Primary Examiner* — Jade R Chwasz
(74) *Attorney, Agent, or Firm* — Cozen O'Connor

(57) ABSTRACT

To provide a mirror structure capable of reflecting incident light with good efficiency and is excellent in reliability. In a mirror structure which is used under an environment that the maximum irradiance of incident light is 5 kW/m² or more and has an area of 0.2 m² or more, the mirror structure is characterized in that the mirror comprises a mirror, a supporting member and a resin-made adhesive sheet to glue the mirror to the supporting member, and is structured such that a dielectric multilayer is formed at least on an incident light side surface of a plate-shaped substrate and the mirror has an average reflectance ratio 95% or more for incident light having a wavelength in a range of 400 to 1000 nm.

18 Claims, 25 Drawing Sheets

FIG. 27A  FIG. 27B  FIG. 27C  FIG. 27D
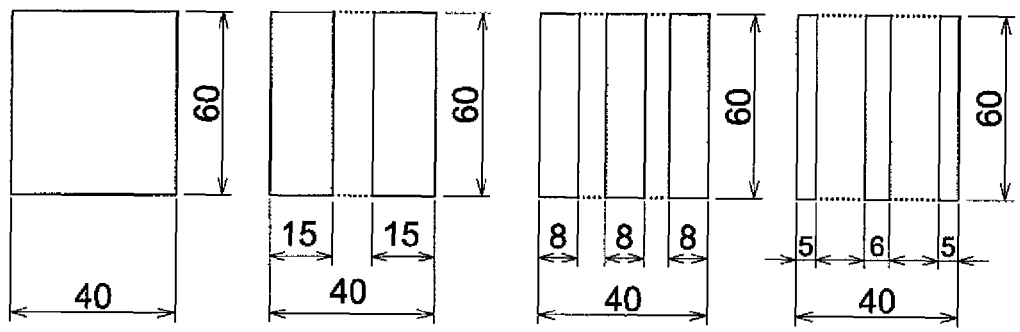
FIG. 27E  FIG. 27F  FIG. 27G
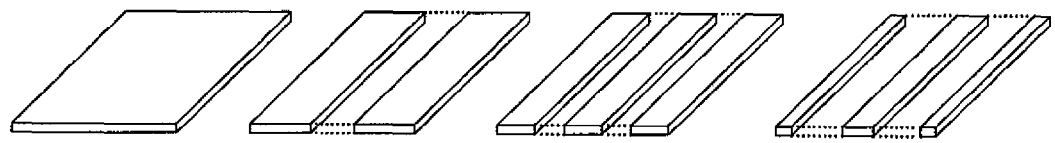
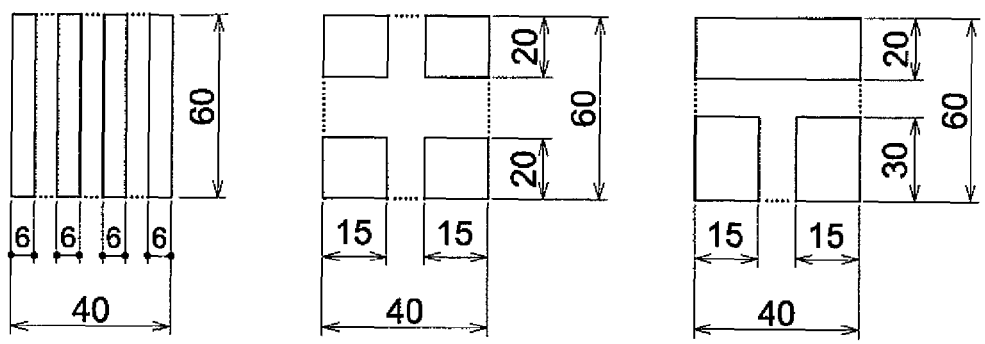

MIRROR STRUCTURE

RELATED APPLICATIONS

This is a U.S. National Phase Application under 35 U.S.C. 371 of International Application PCT/JP2009/062283, filed on Jul. 6, 2009.

This application claims the priority of Japanese Application No. 2008-176460 filed on Jul. 7, 2008, the entire content of which is hereby incorporated by reference.

TECHNICAL FIELD

The present invention relates to a mirror structure, in particular, to a mirror structure suitable to reflect incident light with high intensity.

BACKGROUND ART

Thermal power generation which burns fossil fuel and generates electric power has comparatively low facility cost and the restriction for the installation of an electric power plant is not sever, thermal power generation has been widely used all over the world. Incidentally, the amount of emission of $CO_2$ (carbon dioxide) to cause global warming is increasing continuously every year, therefore, there is the actual circumstances that the reduction of $CO_2$ becomes urgent requirement from a viewpoint of global environment protection. Moreover, since an amount of fossil fuel is limited, fossil fuel should be utilized with saving so as not to be depleted before an energy production technique taking a position of thermal power generation is established. For this reason, although other electric power generating techniques to supplement thermal power generation have been sought, there is a problem that nuclear power generation and hydraulic power generation are hard to be utilized, because the installation of their electric power plants is restricted.

On the other hand, as clean energy which does not give a load to the environment, sunlight energy attracts attention. Generally as a method of changing sunlight into energy, a solar battery has been well known. However, with a current technique, there is the actual circumstance that the electric power generating cost of a solar battery is relatively high in comparison with other plants.

In contrast to this, it has been also considered that sunlight is used directly as energy at relatively low cost. Patent Document 1 discloses a technique that sunlight is condensed and changed into heat energy and the heat energy is converted into electrical power. More concretely, in the technique, sunlight is reflected by a large number of reflecting mirrors (heliostat) arranged a tower and is condensed into a heat exchanging unit by a condensing mirror mounted on the tower so as to heat the heat exchanging unit, and then the heat energy obtained by the heat exchanging unit is sent to an electric power generating unit, whereby electric power is generated.

DOCUMENTS IN THE RELATED ART

Patent documents 1: Japanese Patent Unexamined Publication No. 11-119105

OUTLINE OF THE INVENTION

Problem to be Solved by the Invention

In the condensing mirror adapted to receive incident light from a number of heliostats, the light intensity of incident light becomes very high. Therefore, in a structure to support a condensing mirror, if the structure is made such that claws are protruded from a periphery of the condensing mirror to the reflecting mirror side so as to support the condensing mirror, the claws will be heated by incident light. As a result, there is a problem that the structure is required to have heat resistance property and heat conversion efficiency may be lowered. In contrast to the above, in the case that the reverse side of a mirror is pasted on a supporting member, if the mirror has a reflectance ratio of 100%, it is theoretically possible to avoid the problem in terms of heat. However, it is actually difficult to produce a mirror capable of realizing a reflectance ratio of 100%. Accordingly, incident light having been not reflected is absorbed by a mirror and is converted into heat, the mirror will be heated to an high temperature. For such a high temperature, an adhesive tape with heat resistance is expensive, and an adhesive tape used under a super high temperature of 200° C. or more is restricted in usage. Therefore, there is a problem of how to support a condensing mirror.

The present invention has been accomplished in view of this trouble, and an object of the present invention is to provide a mirror structure capable of reflecting incident light with good efficiency and is excellent in reliability.

Means for Solving the Problem

A mirror structure of the present invention is a mirror structure which is used under an environment that the maximum irradiance of incident light is 5 kW/m² or more, has an area of 0.2 m² or more, and comprises a mirror, a supporting member and a resin-made adhesive sheet to glue the mirror to the supporting member, and the mirror structure is characterized in that the mirror is structured such that a dielectric multilayer is formed at least on an incident light side surface of a plate-shaped substrate and the mirror has an average reflectance ratio 95% or more for incident light having a wavelength in a range of 400 to 1000 nm.

According to the present invention, in the mirror, since a dielectric multilayer is formed at least on an incident light side surface of a plate-shaped substrate, when the incident light side surface is made to a reflective surface, it is possible to refrain incident light to pass in the substrate, whereby the absorption of incident light in the substrate is suppressed and it becomes possible to prevent the mirror from being heated. Therefore, it becomes possible to employ a resin-made adhesive tape which has a relatively low heat resistance, but has a strong adhesive strength and can make the thickness of an adhesive layer uniform, whereby a mirror structure having a good reflective characteristic can be produced at low cost. Further, since the average reflectance ratio of the mirror is 95% or more for incident light having a wavelength in a range of 400 to 1000 nm, the light having a wavelength, for example, in a range of 400 to 1000 nm which has the largest light amount among sunlight can be reflected with high reflectance ratio so that the absorption loss amount in the inside of the substrate can be suppressed. Furthermore, when a range of reflected wavelength is made narrow, a mirror having a high light utilization ratio can be obtained with a dielectric multilayer having a little number of layer structures, whereby the cost and the reflectance characteristics can be optimized. Here, the dielectric multilayer has a structure in which a high refractive index layer and a low refractive index layer are piled up on a substrate, and it is disclosed, for example, in the official document of Japanese Patent Unexamined Publication No. 2005-292462.

The mirror structure described in claim 2 is characterized in the invention described in claim 1 such that plural resin-made adhesive sheets are arranged in a discrete arrangement, and when the shortest distance between two neighboring glued regions among glued regions formed by the resin-made adhesive sheets is D, the specific gravity of the substrate is Sρ, the Young's modulus of the substrate is E, and the thickness of the substrate is t, the following conditional formula is satisfied.

$$0.05 \times \sqrt[3]{(Et^2/S\rho)} < D < 0.2 \times \sqrt[3]{(Et^2/S\rho)} \quad (1)$$

When the incident light side surface of the mirror faces downward in the direction of gravity, the mirror is partially supported by the resin-made adhesive sheet provided to its reverse surface. In this case, a part of the mirror which is not glued will bend downward by its own weight. Here, if the value of D exceeds the upper limit of the conditional formula (1), since a deviation at an arriving position of light reflected on the mirror becomes 1% or more, it is not desirable. On the other hand, if the value of D is less than the lower limit of the conditional formula (1), since the number of resin-made adhesive sheets will increase, the amount of gluing works will become increase and cost becomes high.

The mirror structure described in claim 3 is characterized, in the invention described in claim 1 or 2, such that the heatproof temperature of the resin-made adhesive sheet is 120° C. or more and 200° C. or less.

Since the average reflectance ratio of the mirror is 95% or more for incident light having a wavelength in a range of 400 to 1000 nm, it becomes possible to employ a resin-made adhesive sheet that has a relatively low heat resistance, but has a strong adhesive strength instead. As such a resin-made adhesive sheet, a joining tape for construction or acrylics foam double-face adhesive tape can be used, and as a specific product, for example, a trade name "VHB" produced by Sumitomo 3M, Inc. may be employed.

Further, it is desirable that heat resistance becomes high. However, since the mirror of the present invention has a structure capable of refraining an increase in temperature, it is desirable from the viewpoint of profitability that heat resistance is 200° C. or less.

The mirror structure described in claim 4 is characterized, in the invention described in any of claims 1 to 3, such that in the case that the fracture elongation rate of the resin-made adhesive sheet is 400% or more, when the linear expansion coefficient of a surface plate is A, the linear expansion coefficient of the substrate is B and the thickness of the resin-made adhesive sheet is τ, the following formula is satisfied.

$$10 \times 10^{-6}/K < A < 20 \times 10^{-6}/K \quad (2)$$

$$3 \times 10^{-6}/K < B < 9 \times 10^{-6}/K \quad (3)$$

$$0.3(\text{mm}) < \tau < 2.0(\text{mm}) \quad (4)$$

If the conditional formulas (2) and (3) are satisfied, a linear expansion difference between the above-mentioned surface plate and the substrate becomes small. Therefore, even when a resin-made adhesive sheet having a thickness satisfying the conditional formula (4) is employed, lowering in flatness due to a temperature rise resulting from a linear expansion difference can be refrained.

Further, if the value of τ exceeds the upper limit of the conditional formula (4), it is not desirable, because the distance between the above-mentioned surface plate and the mirror may be extended due to an external force, such as the influence of a wind. On the other hand, if the value of τ is less than the lower limit of the conditional formula (4), the strength of adhesion may be lowered.

The mirror structure described in claim 5 is characterized, in the invention described in any of claims 1 to 4, such that the mirror covers the entire body of the supporting member, when the mirror is looked from the direction of incident light.

With this, it is possible to prevent the supporting member from being heated by being exposed to incident rays with high intensity.

The mirror structure described in claim 6 is characterized, in the invention described in any of claims 1 to 5, such that the gluing portions are distributed in such a way that the area of the gluing portions of the resin-made adhesive sheet to glue the mirror and the supporting member is 5% or more and 20% or less of the total area, and the smaller width of the gluing portion per one position is 50 mm or less.

In the case that the area of the mirror is 0.2 m² or more, since a condensing mirror can be efficiently manufactured as compared with the manufacture in which a number of mirrors having a small area are pasted, it is desirable. However, since it may be difficult to accommodate such a large-sized mirror in a vacuum chamber etc., it is desirable to perform to paste the mirror to the surface plate under an atmospheric pressure. In this case, the glued portions are dispersed in such a way that the area of the glued portions being in close contact with the resin-made adhesive sheet is 5% or more and 20% or less to the total area, and the smaller width of the gluing portion per one position is 50 mm or less. Therefore, the gluing process becomes easy, and an amount of the resin-made adhesive sheet to be used can be reduced. As a result, it is possible to contribute to attain low cost.

The mirror structure described in claim 7 is characterized, in the invention described in any of claims 1 to 6, such that the linear expansion coefficient of the surface plate is smaller than $12 \times 10^{-6}/K$, and the linear expansion coefficient of the substrate is larger than $3 \times 10^{-6}/K$.

When the surface of the mirror becomes dirty due to the adhesion of dust etc., incident light is absorbed on the surface, and the surface becomes a heat source. Therefore, a temperature difference is caused between the substrate constituting the mirror and the surface plate of the supporting member pasted on the reverse surface of the substrate such that the surface plate of the temperature of the supporting member is lower than that of the substrate. In the situation that the predetermined temperature difference is caused as described above, it is preferable that the linear expansion coefficient of the surface plate is larger than that of the substrate as shown in the conditional formulas (2) and (3). However, under the consideration for the difference in linear expansion coefficient between the surface plate and the substrate, when the linear expansion coefficient of the surface plate is smaller than $12 \times 10^{-6}/K$ and the linear expansion coefficient of the substrate is larger than $3 \times 10^{-6}/K$, the difference in the actual line expansion between the surface plate and the mirror becomes a small. As a result, it becomes possible to prevent distortion from taking place on the mirror surface.

Further, it is desirable that the reflectance ratio on the incident light side surface of the mirror is 95 or more for incident light with a wavelength in a range of 400 to 2000 nm. With this, for example, it is possible to reflect light having a wavelength of 400 to 1000 nm corresponding to almost all the wavelength of sunlight by the mirror with such a high reflectance ratio. Therefore, it becomes possible to suppress the amount of absorption loss at the inside of the substrate.

Further, it is desirable that the reflectance ratio on the incident light side surface of the mirror is 95% or more for incident light with a wavelength in a range of 400 to 1000 nm, the reflectance ratio on the surface of the mirror opposite to the incident light side surface is 95% or more for incident light with a wavelength in a range of 1000 to 2000 nm, and the substrate has optical transparency and a thickness of 3 mm or less. In this wary, for example, light having a wavelength of 400 to 1000 nm corresponding to the wavelength range to cover a large amount of light in sunlight is reflected by the dielectric multilayer of the surface of the mirror, and light having a wavelength in a range of 1000 to 2000 nm other than the above wavelength is reflected by the reverse surface of the mirror with the substrate having a thin thickness of 3 mm or less. Accordingly, the wavelength region of incident light to be reflected is shared by the incident light side surface and the reverse surface of the mirror, whereby incident light in a wide wavelength range can be reflected by the use of the dielectric multilayer capable of being produced at a low cost, and it becomes possible to provide a mirror structure capable of suppressing absorption of light.

Moreover, it is desirable that the supporting member comprises a honeycomb core and a surface plate fixed to this honeycomb core, and the resin-made adhesive sheet glues the mirror to the surface plate. With this structure, since the honeycomb core is lightweight and has high rigidity, it is effective in securing the flatness of the mirror.

Moreover, it desirable that the fracture elongation rate of the resin-made adhesive sheet is 400% or more, and the substrate member is made of glass and has a thickness of 0.5 mm or more. With this, in the support medium in which the surface plate is fixed to the honeycomb core, the flatness of a surface plate becomes comparatively good. However, there may be a case that small waviness with small cycle corresponding to the cycle of the honeycomb core remains on the above-mentioned surface plate. In this case, if the mirror is joined to the surface plate with a hard adhesive, there is a possibility that the mirror follows this waviness such that waviness is transferred on the surface of the mirror. In contrast, when the mirror comprising the glass-made substrate with a thickness of 0.5 mm or more is jointed to the surface plate with the resin-made adhesive sheet with a fracture elongation rate of 400% or more, the resin-made adhesive sheet absorbs the waviness, so that it becomes possible to suppress the influence of waviness to the flatness of the mirror.

Moreover, it is desirable that the above-mentioned surface plate is made of stainless steel. Generally, since the stainless steel is high elastic limit as compared with aluminum etc., if a load is applied on it, permanent deformation in geometry does not take place easily on it. Further, the stainless steel has good surface smoothness and the characteristic of hardly getting rusty as compared with iron. Accordingly, the stainless steel is suitable for use in the supporting member. Especially, since the stainless steel has good compatibility with the resin-made adhesive sheet, there is an advantage that the adhesive strength of the resin-made adhesive sheet to stainless steel is made high about 1.2 times to the adhesive strength to aluminum. In addition, it is desirable that the thickness of the surface plate made of stainless steel is 0.6 mm to 1.2 mm.

Moreover, when the width of the minimum portion of the mirror is Wmin, the thickness of the supporting member is t, and the average density of the supporting member is $\rho$ (g/cm$^3$), it is desirable to satisfy the following conditional formulas.

$$0.5(g/cm^3) < \rho < 1(g/cm^3) \quad (5)$$

$$0.01 < t^3/Wmin^2 < 0.05 \quad (6)$$

With this, if the average density $\rho$ is made high, the strength of the supporting member increases, but if it exceeds the upper limit of the conditional formula (5), the weight becomes over the limit. On the contrary, when the average density $\rho$ is so small to be less than the lower limit of the conditional formula (5), it causes lack of strength. Therefore, it is desirable for the average density $\rho$ to satisfy the conditional formula (5). Further, the conditional formula (6) specifies the thickness t of the supporting member corresponding to the size of the mirror, if the value of $t^3/Wmin^2$ is not less than the lower limit of the conditional formula (6), since the supporting member has a sufficient strength against a wind load etc., it is desirable. On the other hand, if the value of $t^3/Wmin^2$ is made not to exceed the upper limit of the conditional formula (6), since the supporting member becomes a weight easy to hold, it is desirable.

Moreover, it is desirable that the plural resin-made adhesive sheets are arranged with a distance and glue the mirror to the surface plate. If the mirror is joined to the surface plate by the entire surface adhesion, there is a possibility that air bubbles may be held between the mirror and the surface plate and the held air bubbles may reduce the flatness of the mirror. As compared with this, if the plural resin-made adhesive sheets are arranged with a distance, since air will escape through gaps, it is possible to secure the flatness of the mirror without holding air bubbles between the mirror and the surface plate.

Moreover, when the width of the maximum portion of the mirror is Wmax, a difference in linear expansion coefficient between the surface plate and the substrate member is $\Delta\beta$, and the thickness of the resin-made adhesive sheet is $\tau$, it is desirable to satisfy the following conditional formula.

$$100 < \tau(Wmax \cdot \Delta\beta) < 500 \quad (7)$$

If the value of $\tau/(Wmax \cdot \Delta\beta)$ exceeds the lower limit of the conditional formula (7), even if a temperature rise of 100° C. occurs, a difference in linear expansion between the honeycomb and the mirror substrate is absorbed by the elongation of an adhesive sheet, whereby it becomes possible to suppress the deformation of the surface of the mirror. On the other hand. If the value of $\tau/(Wmax \cdot \Delta\beta)$ is less than the upper limit of the conditional formula (7), since the resin-made adhesive sheet does not become thick more than needed, an amount of deformation in the compression direction and the extension direction becomes small, whereby it becomes possible to maintain the surface accuracy of the mirror.

Effect of the Invention

According to the present invention, it is possible to provide a mirror structure capable of reflecting incident light with good efficiency and being excellent in reliability.

BRIEF DESCRIPTION OF THE DRAWING

FIG. 27 is a drawing showing seven types of patterns in which small pieces of the resin-made adhesive sheet VHB are arranged with some dispersion in different patterns.

EMBODIMENT FOR ACHIEVING THE INVENTION

Figure 1:
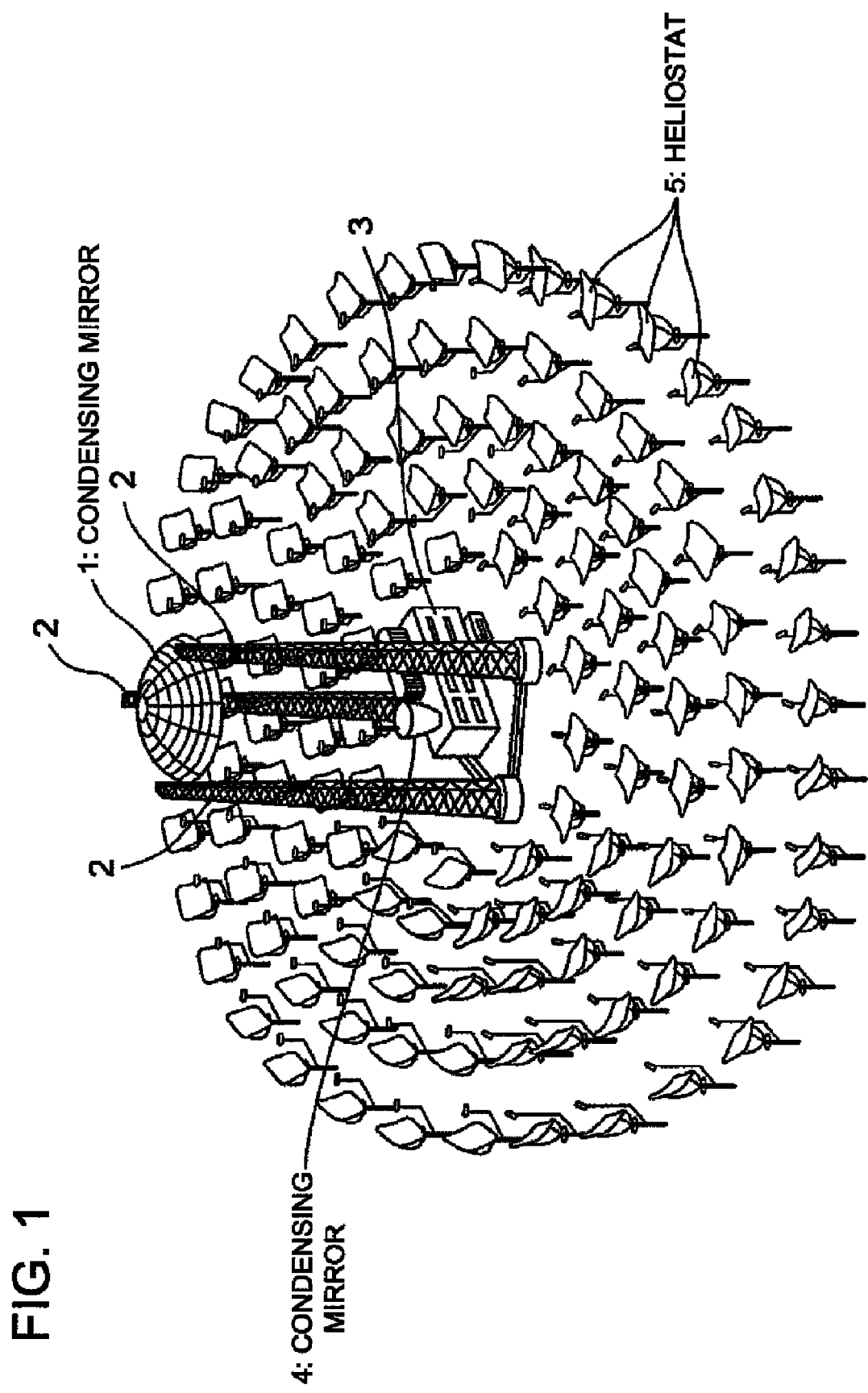
FIG. 1 is a perspective view of a sunlight condensing system employing a mirror structure according to the present invention.
Figure 2:
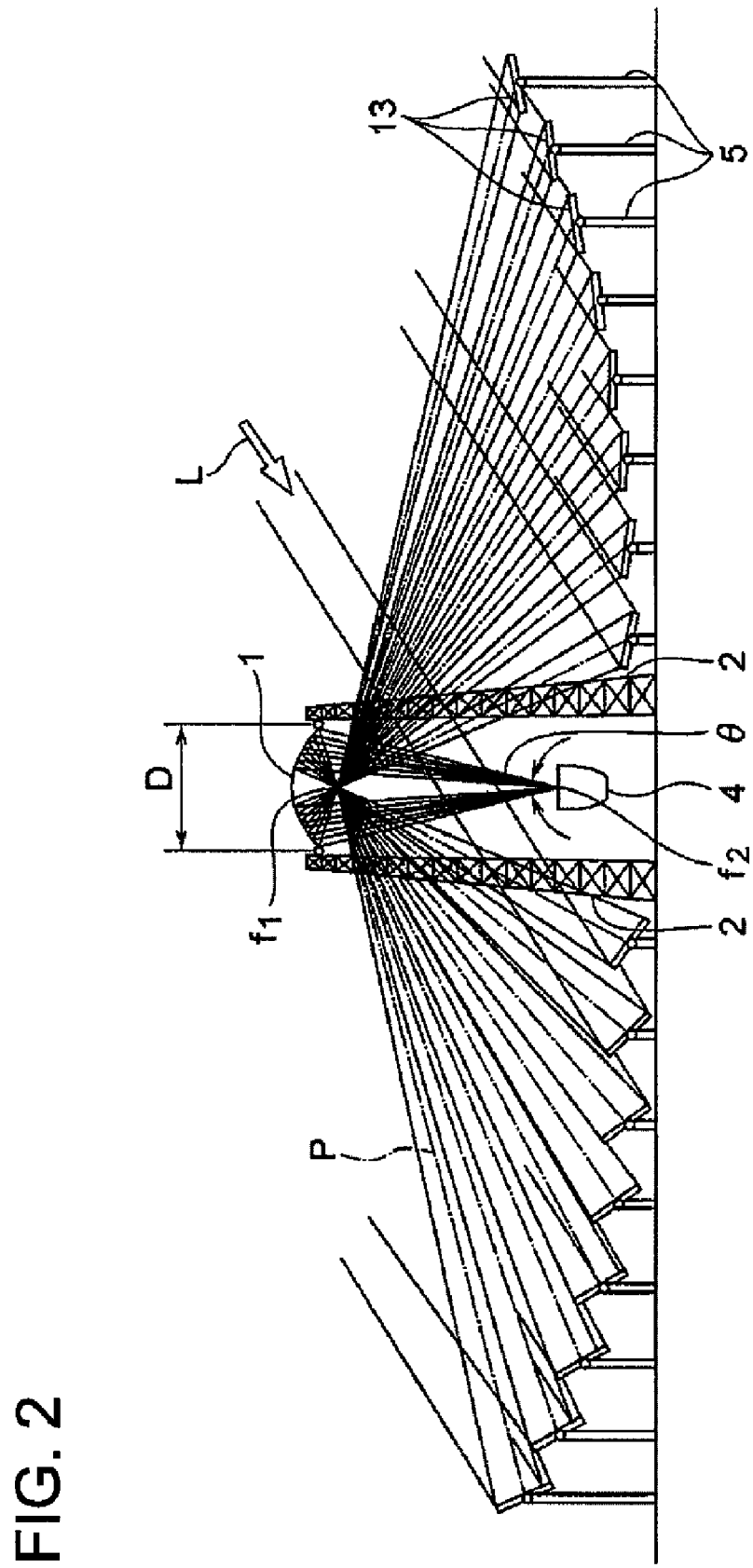
FIG. 2 is a view looking the sunlight condensing system according to the present invention from its side.

Hereafter, with reference to drawings, an embodiment of the present invention will be described more in detail. FIG. 1 is a perspective view of the sunlight condensing system employing a mirror structure according to the present invention. FIG. 2 is a drawing viewing this sunlight condensing system from its side. In FIGS. 1 and 2, a condensing mirror 1 being a second optical element has a comparatively large diameter, is constituted with plural sheets of planate mirror structures which are combined in the form of an ellipse, and supported by three supporting towers 2 at a position with a predetermined height on the condition that its reflective surface faces downward. Under the condensing mirror 1, built is a heat exchange facility 3 which accommodates a heat exchanging unit to convert sunlight into heat energy, and on the upper part of this heat-exchange facility 3, a cylindrical condensing mirror 4 is installed. Further, on the ground around the heat exchange facility 3, a number of heliostats 5 are arranged on the condition that the heliostats 5 surround the condensing mirror 1. The condensing mirror 1 is made such that light with the maximum irradiance of not less than 5 kW/m² enters into it.

Figure 3:
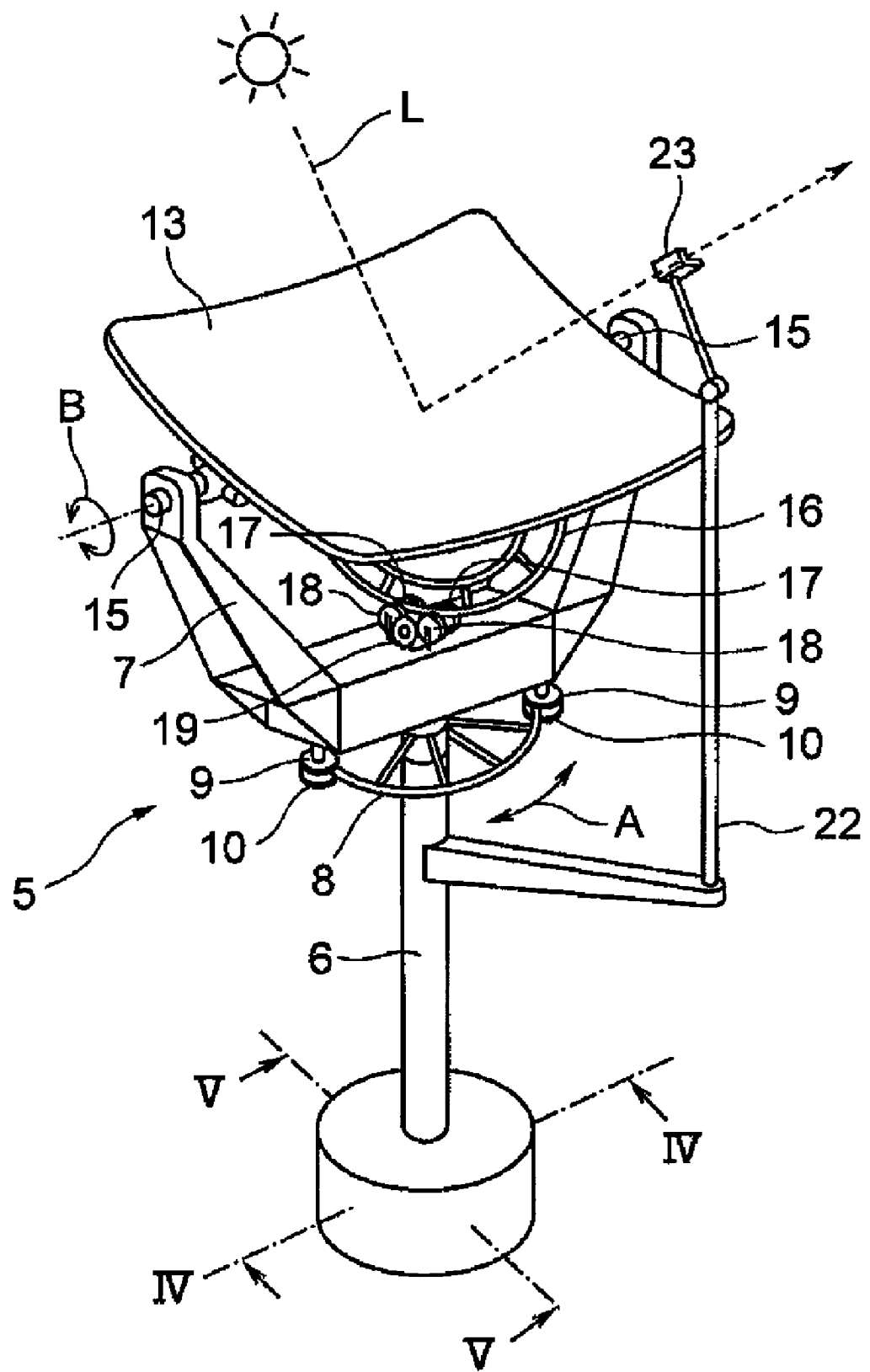
FIG. 3 is a perspective view of a heliostat 5.
Figure 4:
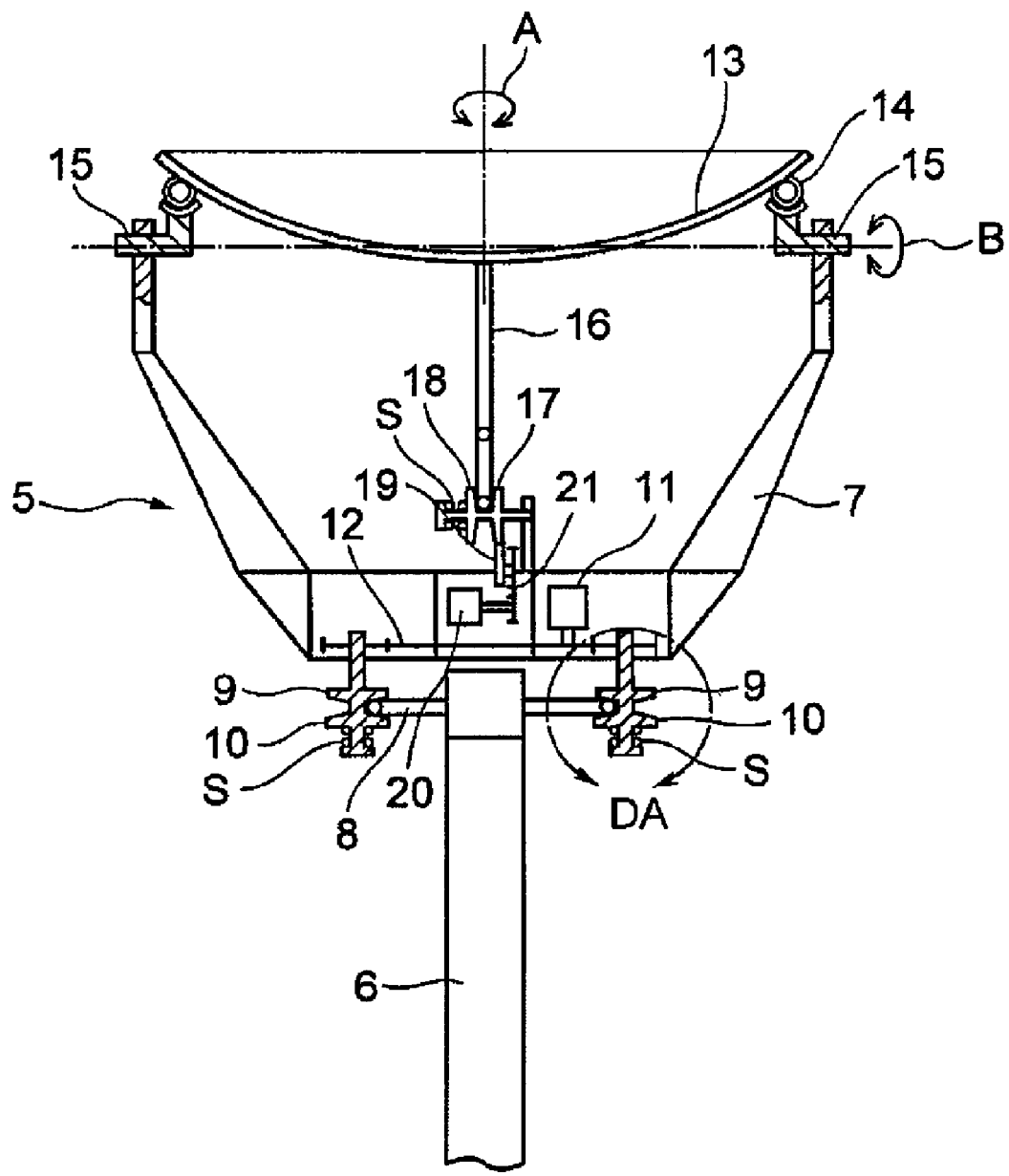
FIG. 4 is a cross sectional view of the structure of FIG. 3 which is cut at a plane of a IV-IV line and looked from the arrowed mark direction.
Figure 5:
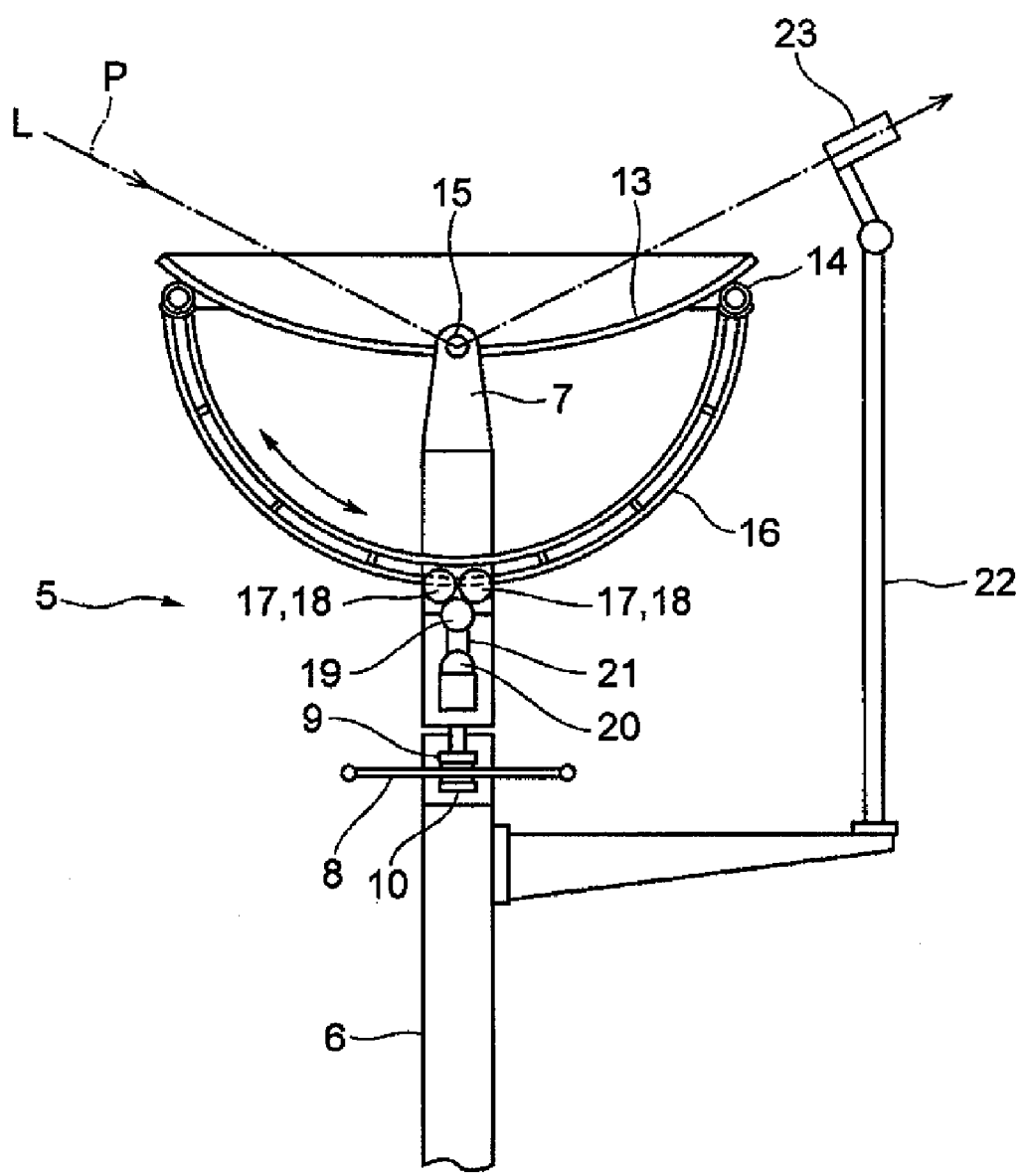
FIG. 5 is a cross sectional view of the structure of FIG. 3 which is cut at a plane of a V-V line and looked from the arrowed mark direction.

FIG. 3 is a perspective view of a heliostat 5. FIG. 4 is a cross sectional view of the structure of FIG. 3 which is cut at a plane of a IV-IV line and looked from the arrowed mark direction. FIG. 5 is a cross sectional view of the structure of FIG. 3 which is cut at a plane of a V-V line and looked from the arrowed mark direction.

In FIGS. 3 and 4, a supporting pole 6 of the heliostat 5 is installed on the ground and is extended, and, to the upper part of the supporting pole 6, a fork 7 is attached such that the fork 7 can rotate and shift freely in the direction of azimuth angle (A direction) in connection with the supporting pole 6. Further, around the upper end of the supporting pole 6, a ring-shaped rail 8 is provided. Furthermore, the underside of fork 7, rotating pulleys 9 are rotatably mounted at opposite positions across the supporting pole 6, respectively, and pressing pulleys 10 are provided adjacently to the rotating pulleys 9 and are urged toward the rotating pulleys 9 with aid of springs S. Between the rotating pulleys 9 and the pressing pulleys 10, a ring-shaped rail 8 is pinched and held. A timing belt 12 is stretched and wound around the pair of rotating pulleys 9 so that the pair of rotating pulleys 9 rotates synchronously. Accordingly, when a motor 11 is driven, the rotating pulleys 9 rotate via the timing belt 12, and the fork 7 rotates in the direction of azimuth angle. At this time, since the ring-shaped rail 8 is pressed with the pressing pulleys 10, the fork 7 can perform a stable rotation.

On the upper end of the fork 7, a concave mirror 13 being a first optical element is held so as to rotate in the direction of elevation angle (B direction) freely. The concave mirror 13 is shaped in the form of a rectangular plate and has a reflective surface being a curved surface (including an aspheric surface, a paraboloidal surface, etc.). However, this reflective surface may be a flat surface.

Circular pipes 14 are fixed to the reverse side of the concave mirror 13. As shown in FIG. 4, at the central point of each of opposite sides of the concave mirror 13, rotation shafts 15 are fixed to the circular pipes 14 respectively so as to align along an axis. The pair of rotation shafts 15 extending in the horizontal direction is supported on the upper end of the fork 7. Therefore, the concave mirror 13 is adapted to be rotatable around the axis of the rotation shafts 15 in the direction of elevation angle.

On the other hand, as shown in FIG. 5, at the central point of each of two sided different from the two sides on which the rotation shafts 15 are provided, the both ends of the circular rail 16 are fixed. On the bottom plane at the central section of the fork 7, two sets of a rotating pulley 17 and a pressing pulley 18 being urged with a spring (not shown in the drawing) are provided, and the circular rail 16 is pinched and supported by each of the rotating pulley 17 and the pressing pulley 18. Further, to the fork 7, a power pulley 19 is provided so as to engage with both of the rotating pulleys 17, and around the power pulley 19, stretched and wound is a timing belt 21 to which power is transmitted from a motor 20. With the above configuration, when the motor 20 is driven, the power pulley 19 and the rotating pulley 17 are rotated through the timing belt 21, whereby the circular rail 16 is shifted relatively, and the concave mirror 13 can rotate around the rotation shafts 15 and shift in the direction of elevation angle. Herein, in order to make the adjustment of the heliostat 5 easy, a red seal (coloring section) and the like may be pasted on a portion of the 13 such that it makes possible to confirm visually the direction in which light proceeds. After the adjustment, the red seal may be removed.

The height of the concave mirror 13 of the heliostat 5 becomes gradually high as the position of the concave mirror 13 separates from the condensing mirror 1 at the central section. This is because a concave mirror 13 is made to be prevented from becoming a shadow for another concave mirror 13 at the time of reflecting sunlight, whereby a shading loss can be prevented from taking place.

Figure 6:
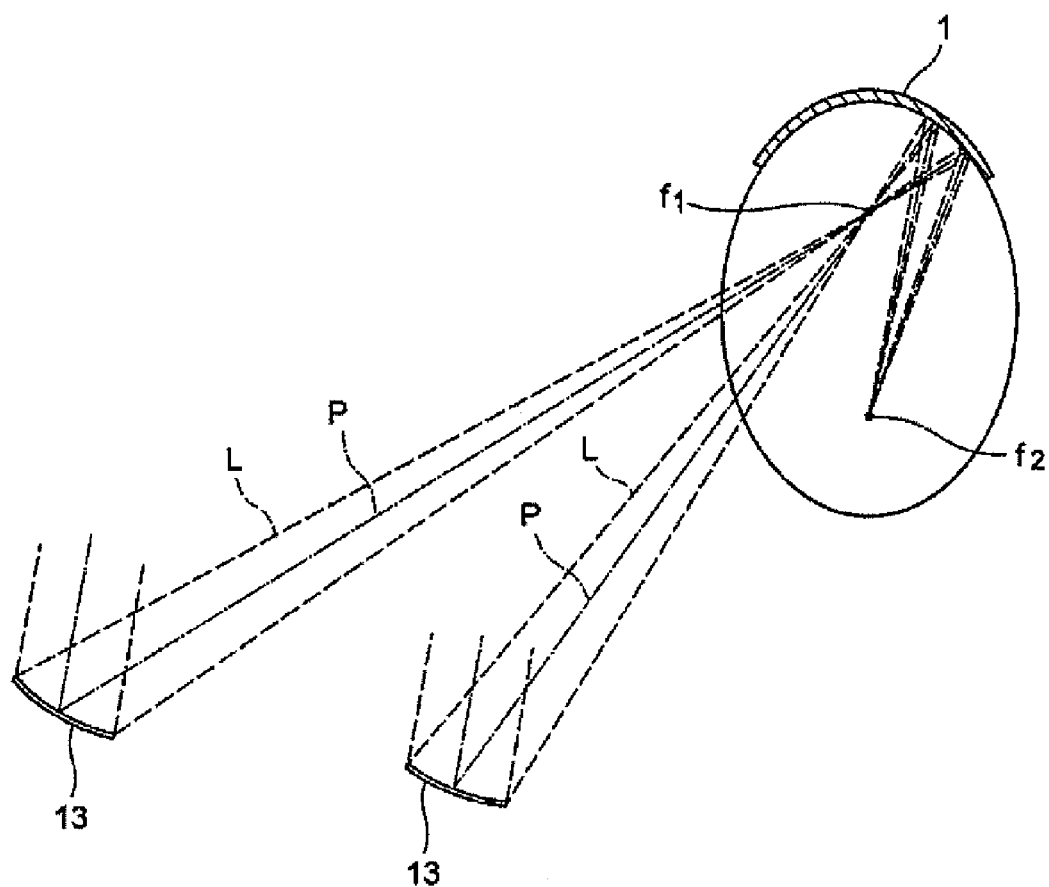
FIG. 6 is a diagram showing a relationship in terms of the position of focal point between a condensing mirror and a concave mirror.

Moreover, in FIG. 3, a sensor 23 is fixed to the supporting pole 6 of the heliostat 5 through a arm 22 attached the supporting pole 6. The sensor 23 is used to detect the incident direction of sunlight L. That is, motors 11 and 20 are controlled by signals outputted from the sensor 23, so that the sunlight L reflected with the concave mirror 13 always proceeds to the first focal point f1 (refer to FIG. 6) of the condensing mirror 1. With this, even if the incident direction of sunlight L changes in accordance with the passage of time, it is made possible to reflect the sunlight L from the concave mirror 13 toward the first focal point f1 of the condensing mirror 1 surely. Sunlight reflected from each concave mirror 13 toward the condensing mirror 1 is further reflected on the condensing mirror 1 and proceeds to a condensing mirror 4.

Figure 7:
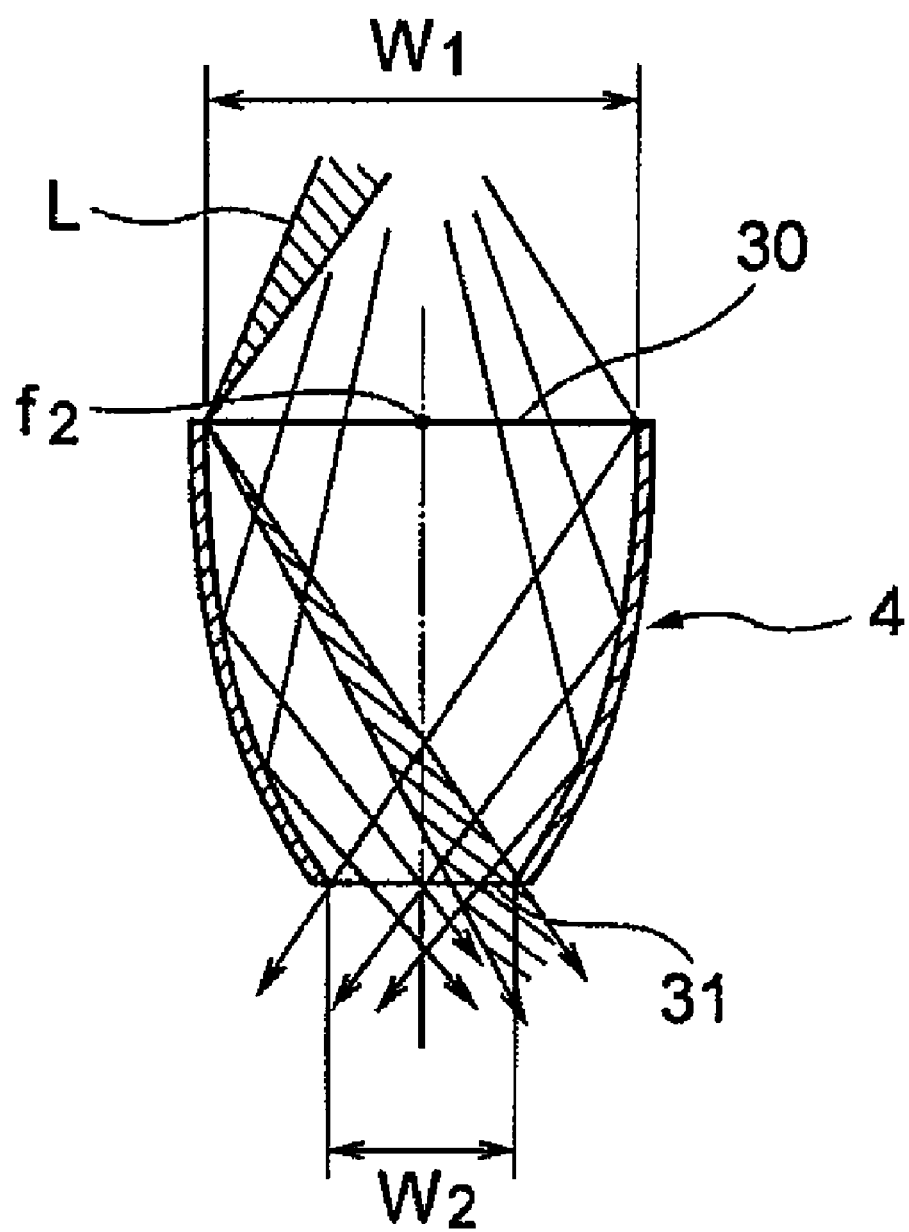
FIG. 7 is a cross sectional view of a cylindrical condensing mirror.

With regard to light being required to be reflected on the inside of this condensing mirror 4, it may be preferable that, as shown in FIG. 7, the light enters from an upper opening 30, is reflected only one time in the inside, and exits from a lower opening 31 having a narrower diameter. However, it may be free to make the lower opening 31 with the small diameter such that the light is reflected two times or more in the inside. The sunlight L which exit from the lower opening 31 is sent into the heat exchange facility 3, and is converted into heat energy by a predetermined heat exchanging unit, whereby electric power can be generated by the utilization of the heat energy.

Figure 8:
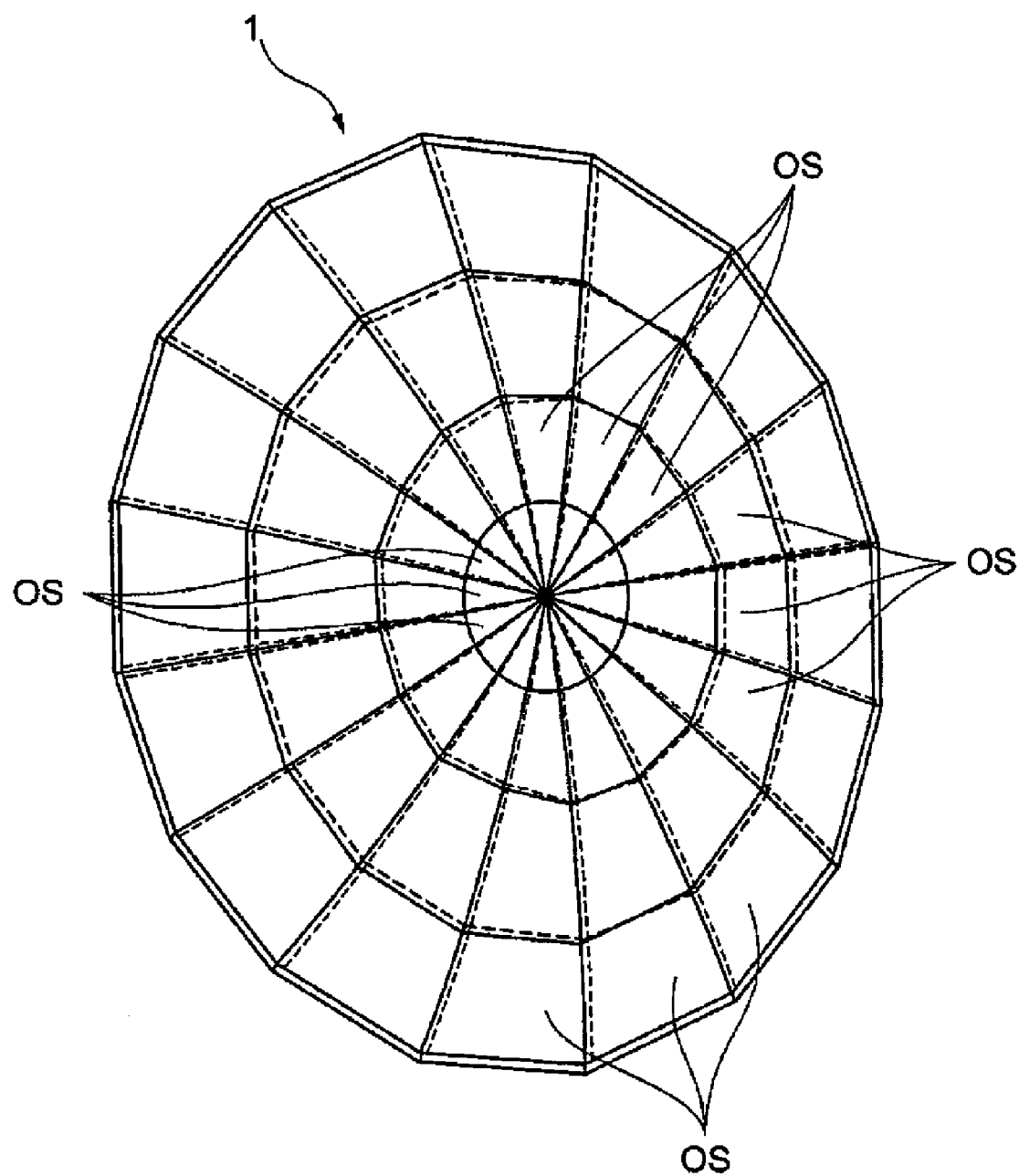
FIG. 8 is an outline perspective view of a condensing mirror 1.

FIG. 8 is an outline perspective view of a condensing mirror 1. The condensing mirror 1 has the configuration that a plurality of plate-shaped mirror structures OS having plate-shaped mirrors are arranged in point symmetry along a curved surface.

Figure 9:
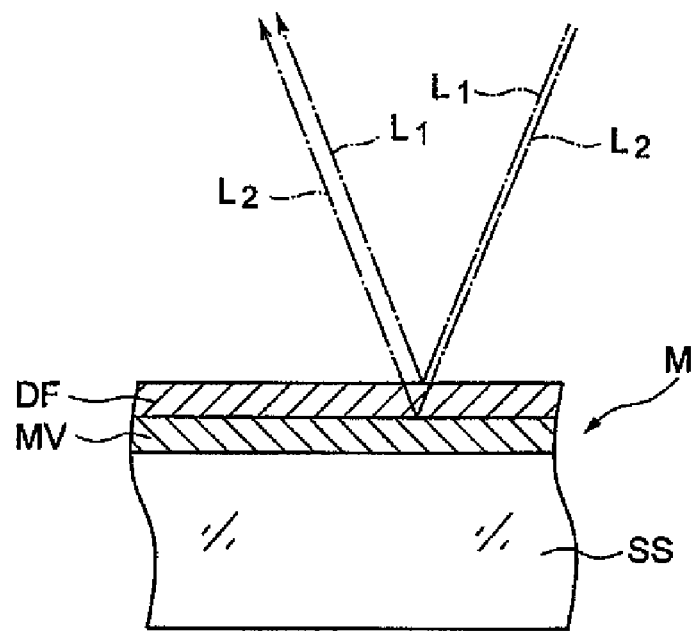
FIG. 9 is a cross sectional view of a mirror M which can be used for a condensing mirror 1.

A cross sectional view of a mirror M used for the mirror-structures OS is shown in FIG. 9. For the purpose of making it easy to understand, the film thickness is drawn to be thicker than the actual size in comparison with the thickness of a substrate. As reflective films, on the side of a parallel plate-shaped glass substrate SS where sunlight enters, a dielectric multilayer DF and a metal deposition film MV are formed in this order from the light incident side. Here, the dielectric multilayer DF has a high reflectance for light only in short wavelength band. Therefore, when sunlight enters a mirror M, among the sunlight, light L1 in a short wavelength band (400 nm to 1000 nm) is reflected on the dielectric multilayer DF. On the other hand, light L2 in a long wavelength band (1000 nm to 2000 nm) other than the light L1 passes the dielectric multilayer DF, is reflected by the metal deposition film MV, further passes the dielectric multilayer DF, and is emitted from the mirror M. With this, it is possible to secure a high reflectance (not less than 95%) in a wide band (400 nm to 2000 nm), and also it is possible to suppress sunlight from reaching the substrate SS and to suppress the mirror M from being heated, whereby the mirror M is preferable for the condensing mirror 1. Further, the reflectance not less than 95% may be realize with the dielectric multilayer DF without the installation of the metal deposition film MV.

Figure 10:
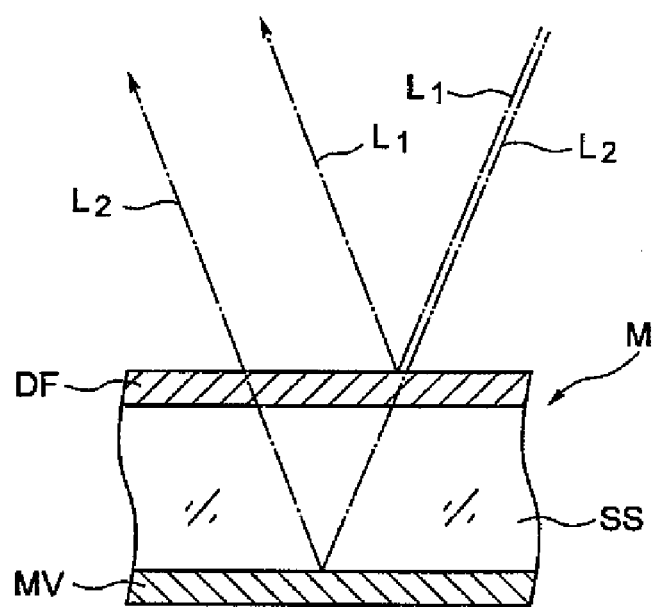
FIG. 10 is a cross sectional view of a mirror M according to a modified example.

FIG. 10 is a cross sectional view of a mirror M used for a mirror structure OS according to a modified embodiment. In the modified embodiment, a metal deposition film MV is formed in the reverse surface (a surface opposite to an incident light side surface) of the mirror M. The thickness of the substrate SS is desirably 0.5 mm or more and 3 mm or less. When sunlight enters a mirror M, among the sunlight, light L1 in a short wavelength band (400 nm to 1000 nm) is reflected on the dielectric multilayer DF. On the other hand, light L2 in a long wavelength band (1000 nm to 2000 nm) other than the light L1 passes the dielectric multilayer DF, passes the substrate SS, is reflected by the metal deposition film MV on the reverse side surface, further passes the substrate SS and the dielectric multilayer DF, and is emitted from the mirror M. With this, it is possible to secure a high reflectance (not less than 95%) in a wide band (400 nm to 2000 nm) as the total.

Figure 11:
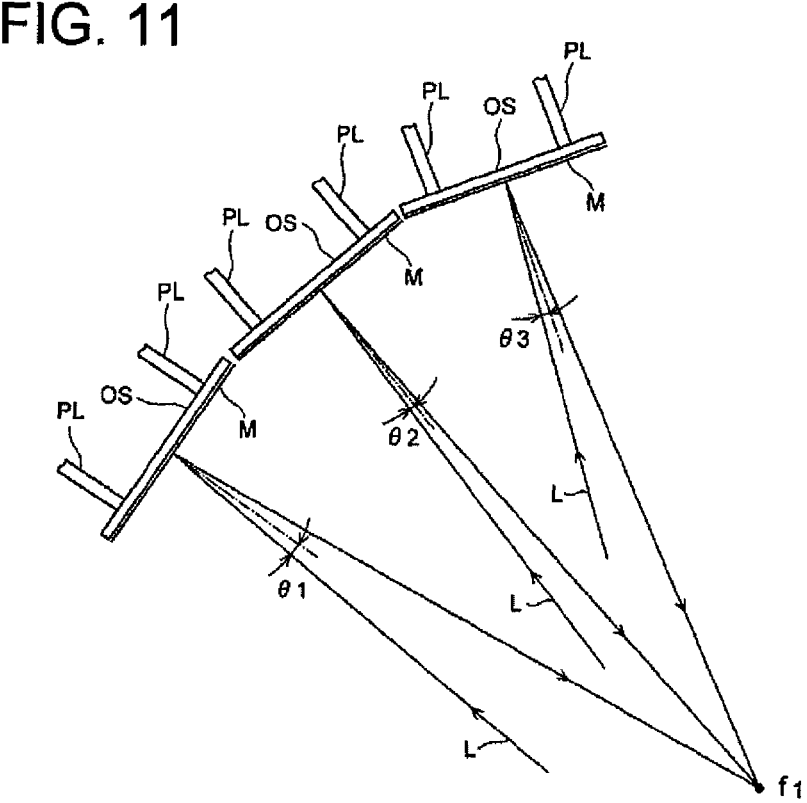
FIG. 11 is a partial cross sectional view of a condensing mirror 1.

FIG. 11 is a partial cross sectional view of a condensing mirror 1. On the incident light side surface (the surface facing downward in terms of the gravity direction) of the mirror structure OS supported by the supporting pole PL, a mirror M is attached. There is not a clearance between adjoining mirrors M, therefore, incident light does not come into the supporting pole PL side. Light beams L reflected from the mirrors M pass the first focal point f1 mostly. Therefore, it is assumed that the incident angle of each of sunlight beams L entering the respective mirrors M from the respective concave mirrors 13 is set to $\theta1$, $\theta2$, and $\theta3$, respectively, even if the incident direction of each of the sunlight L changes in accordance with the passage of time, the incident angles $\theta1$, $\theta2$, and $\theta3$ hardly change. Therefore, if the mirror structure OS is designed to correspond to these incident angles $\theta1$, $\theta2$, and $\theta3$, even if the film thickness of a dielectric multilayer is thick, it becomes possible to make the mirror structure OS to exhibit a desired optical characteristic. Further, as shown in FIGS. 1 and 2, since the condensing mirror 1 is installed such that a reflective surface of the condensing mirror 1 faces downward in terms of the gravity direction, there are few possibilities that a dielectric multilayer is injured with falling objects, such as snow, hail, and dust, whereby the mirror structure OS can exhibit its optical characteristic stably over a long period of time.

Figure 12:
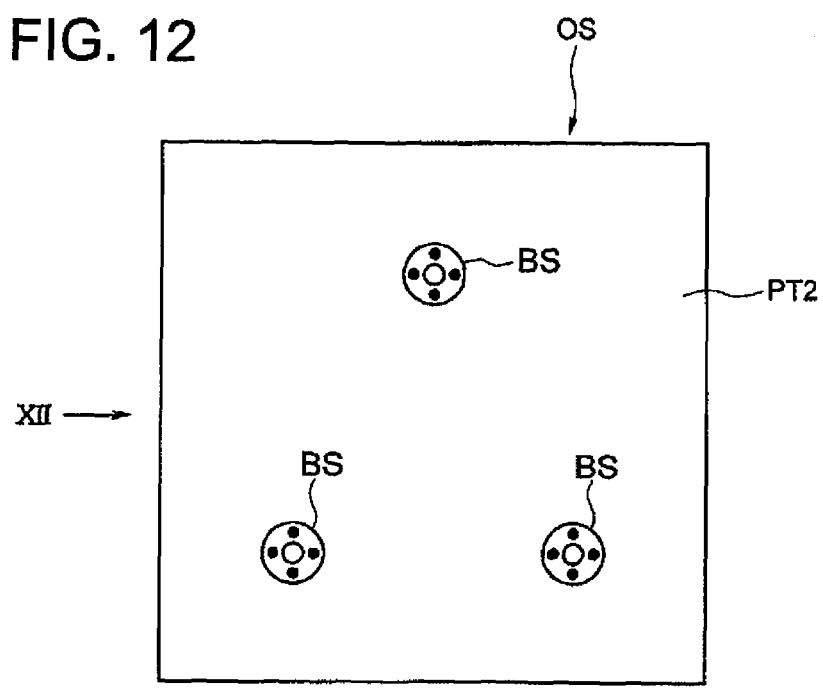
FIG. 12 is a drawing looking a mirror structure OS from a supporting pole side.
Figure 13:
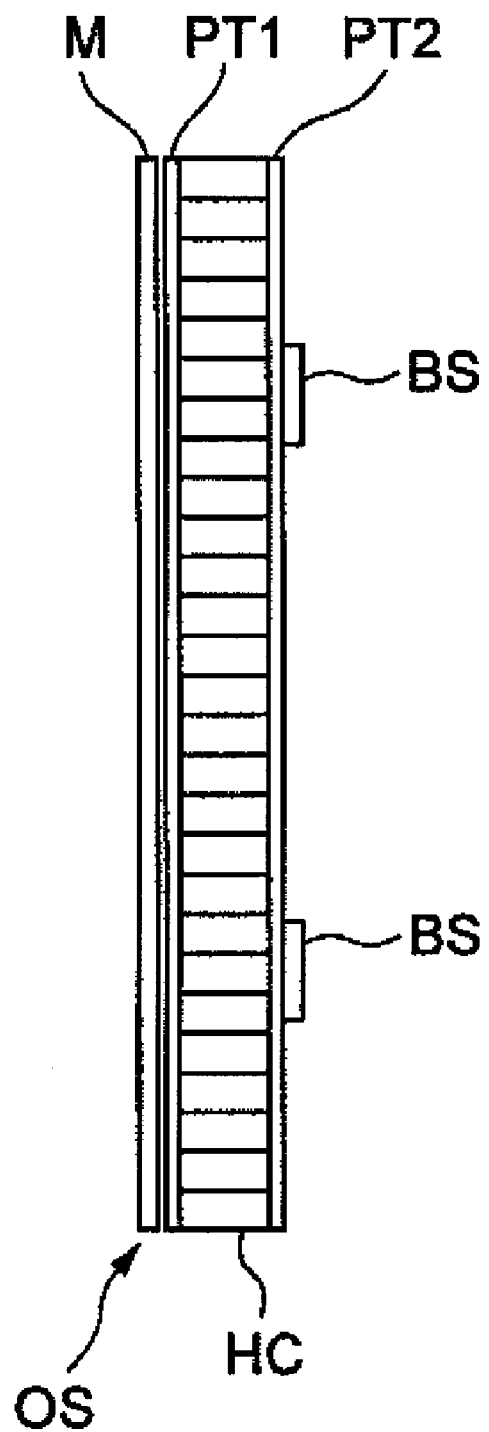
FIG. 13 is a drawing looking the mirror structure OS shown in FIG. 12 from a direction of arrowed mark XII.
Figure 14:
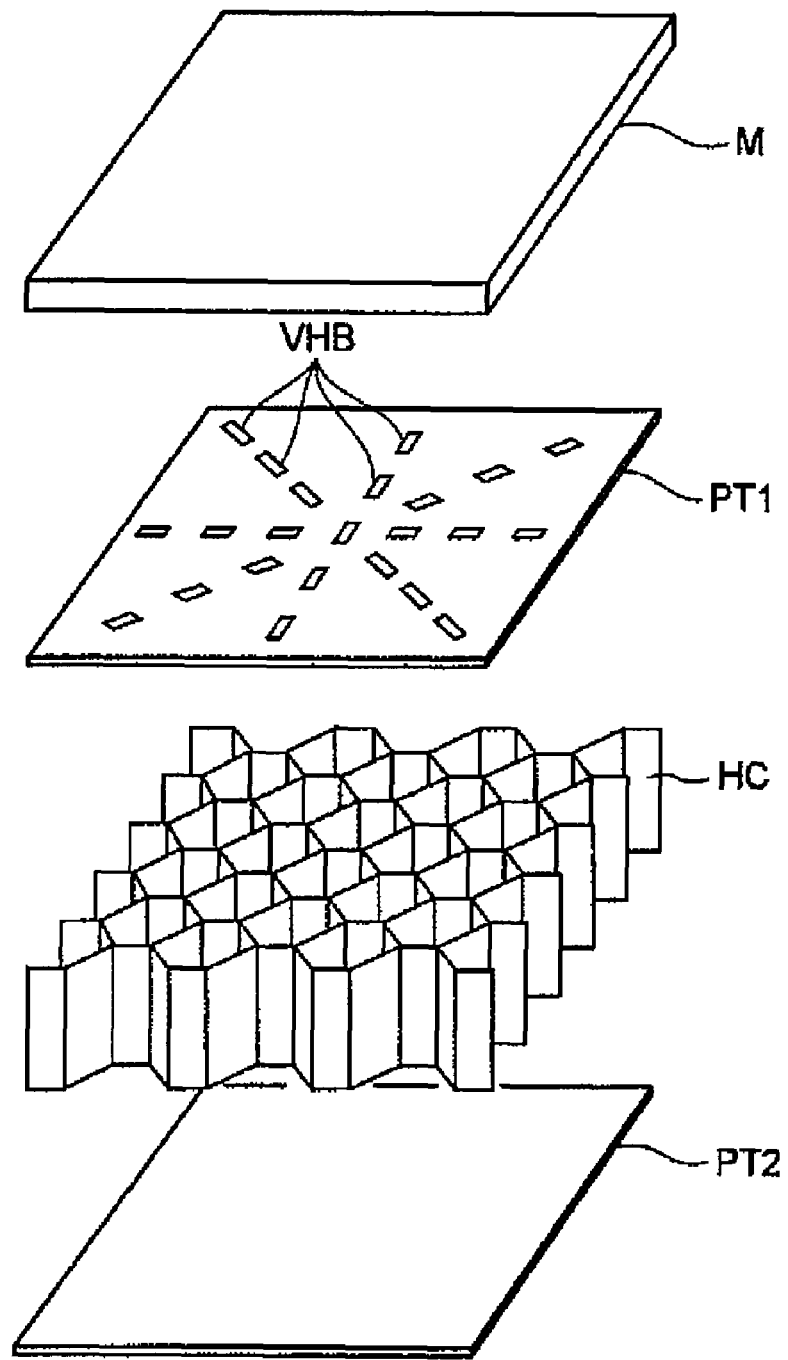
FIG. 14 is an exploded drawing in which the mirror-structure OS is disassembled.

FIG. 12 is a drawing in which the mirror structure OS is looked from the supporting pole side, FIG. 13 is a drawing in which the mirror structure OS of FIG. 12 is looked in the XII direction with arrowed mark, and FIG. 14 is an exploded drawing in which the mirror-structure OS is disassembled. In FIG. 14, the mirror structure OS is constituted such that a honeycomb core HC made of aluminum is sandwiched between surface plates PT1, PT2 made of stainless steel and fixed with adhesive to form a support member, and on the surface plate PT1 at the incident light side, a mirror M is pasted by the use of a resin-made adhesive sheet VHB. On the surface plate PT2 at the opposite side, as shown in FIG. 12, a disc-shaped mounting seat BS of attaching a pole is joined. According to this embodiment, the mirror M is adapted to make its own weight supported by only the resin-made adhesive sheet VHB. Therefore, it is not necessary to arrange a supporting member onto its incident light side surface, whereby it is made possible to refrain the mirror structure OS from being heated.

The mirror M has a dimension of 1 m×1 m (namely, Wmin=1 m, Wmax=1.41 m), and the dimension of each of the surface plates PT1, PT2 and honeycomb core HC having the same figure or a similar figure as the mirror M is made smaller than the mirror M. Therefore, they are covered with the mirror M, when being looked from the direction of incident light. The thickness of the mirror M is 2 mm. Further, the thickness of surface plates PT1 and PT2 is 0.8 mm, respectively, and the thickness "t" of the supporting member including the honeycomb core HC is 25 mm, and the thickness "τ" of the resin-made adhesive sheet VHB is 1 mm.

Hereafter, the desirable values of each of the above-mentioned conditional formulas are shown.

| | |
|---|---|
| $D=20$ cm, $\sqrt[3]{(Et^2/S\rho)}=218$ cm | Conditional formula (1): |
| $A=10.4\times10^{-6}/K$ | Conditional formula (2): |
| $B=8\times10^{-6}/K$ | Conditional formula (3): |
| $\tau=1.0$ m | Conditional formula (4): |
| $\rho=0.68$ g/cm$^3$ | Conditional formula (5): |
| $t^3/W\text{min}^2=0.016$ | Conditional formula (6): |
| $\tau/(W\text{max}\cdot\Delta\beta)=296$ | Conditional formula (7): |

Figure 15:
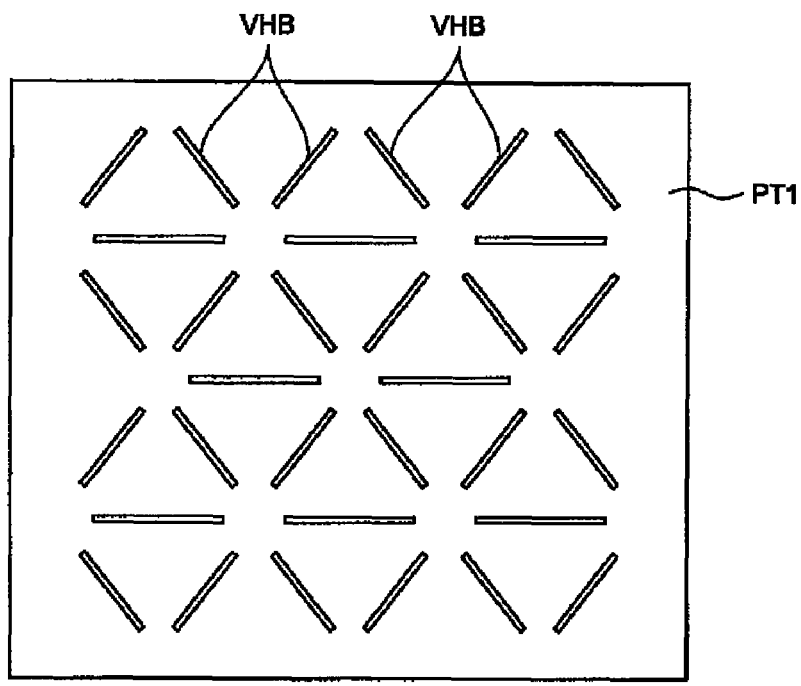
FIG. 15 is a drawing showing an example of a distribution pattern of resin-made adhesive sheets VHB.
Figure 16:
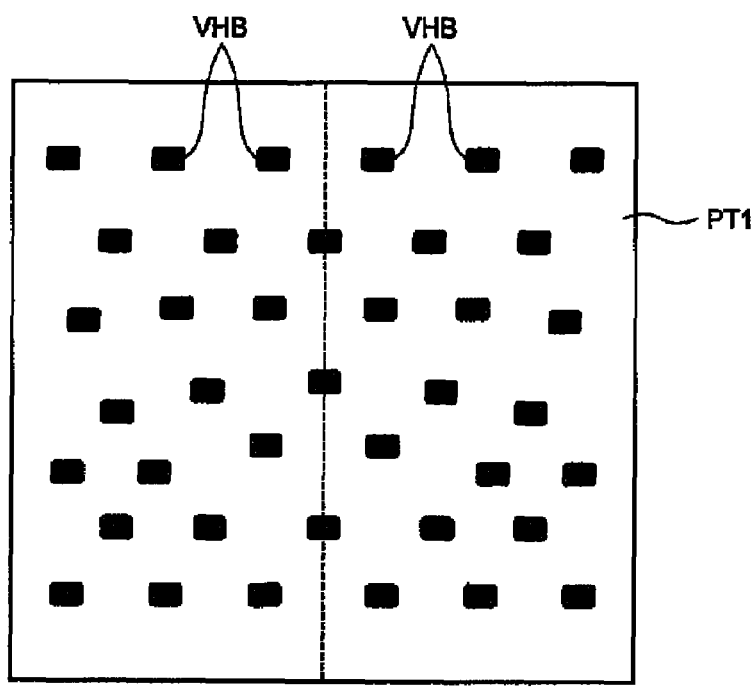
FIG. 16 is a drawing showing an example of a distribution pattern of resin-made adhesive sheets VHB.
Figure 17:
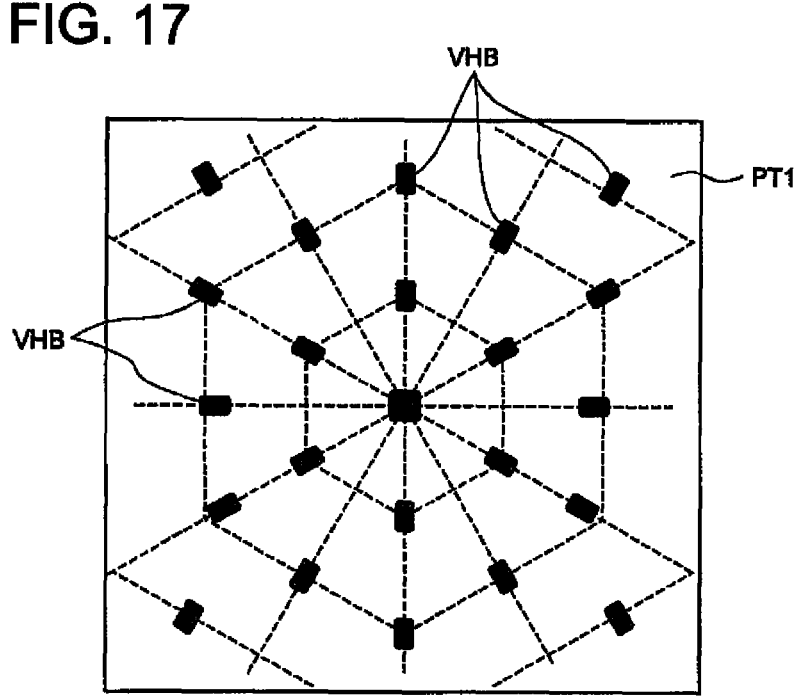
FIG. 17 is a drawing showing an example of a distribution pattern of resin-made adhesive sheets VHB.

FIGS. 15-17 each is a drawing showing a distribution pattern of a resin-made adhesive sheet VHB. In the example shown in FIG. 15, a resin-made adhesive sheet VHB is cut into the form of a line, and the line-shaped resin-made adhesive sheets VHB are arranged in the form of a mountain with a gap. In the example shown in FIG. 16, a resin-made adhesive sheet VHB is cut into the form of rectangular, and small pieces of the rectangular-shaped resin-made adhesive sheet VHB are arranged vertically horizontally in a staggered layout. In the example shown in FIG. 17, a resin-made adhesive sheet VHB is cut into the form of rectangular, and small pieces of the rectangular-shaped resin-made adhesive sheet VHB are arranged in a radial layout. In any one of the above examples, in the case that the area of a mirror is 0.2 m$^2$ or more, it is desirable that the area of the adhesion part being in close contact with the resin-made adhesive sheet VHB is 5% or more and 20% or less of the total area, and a smaller width of an adhesion portion per one place is 50 mm or less.

Figure 25:
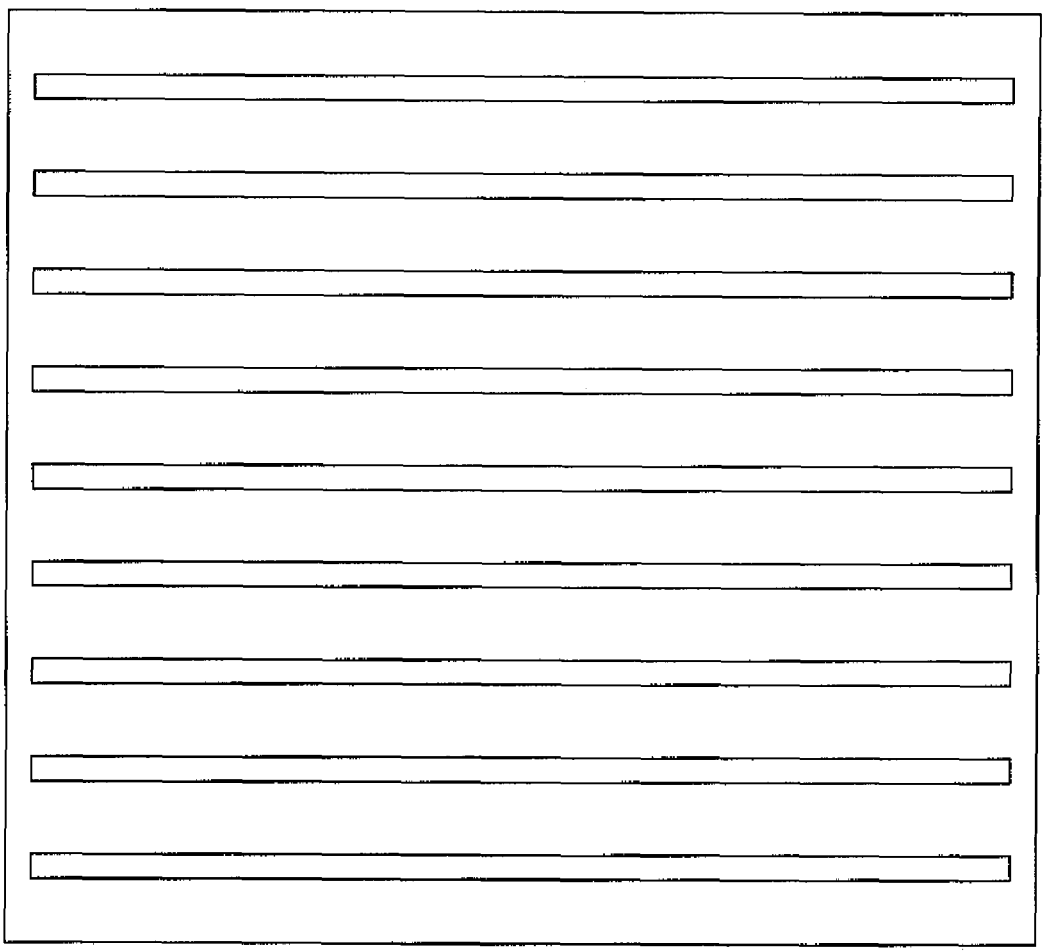
FIG. 25 is a drawing showing a pattern in which the width of small pieces of the resin-made adhesive sheet VHB is 50 mm or less to form a long and thin pattern and the number of small pieces is reduced.

Further, FIG. 25 shows a pattern in which the width of small pieces of the resin-made adhesive sheet VHB shown in FIG. 16 is 50 mm or less to form a long and thin pattern and the number of small pieces is reduced. With this pattern, since the working hours for joining can be shortened, it is effective in reducing the manufacturing expense.

Figure 26:
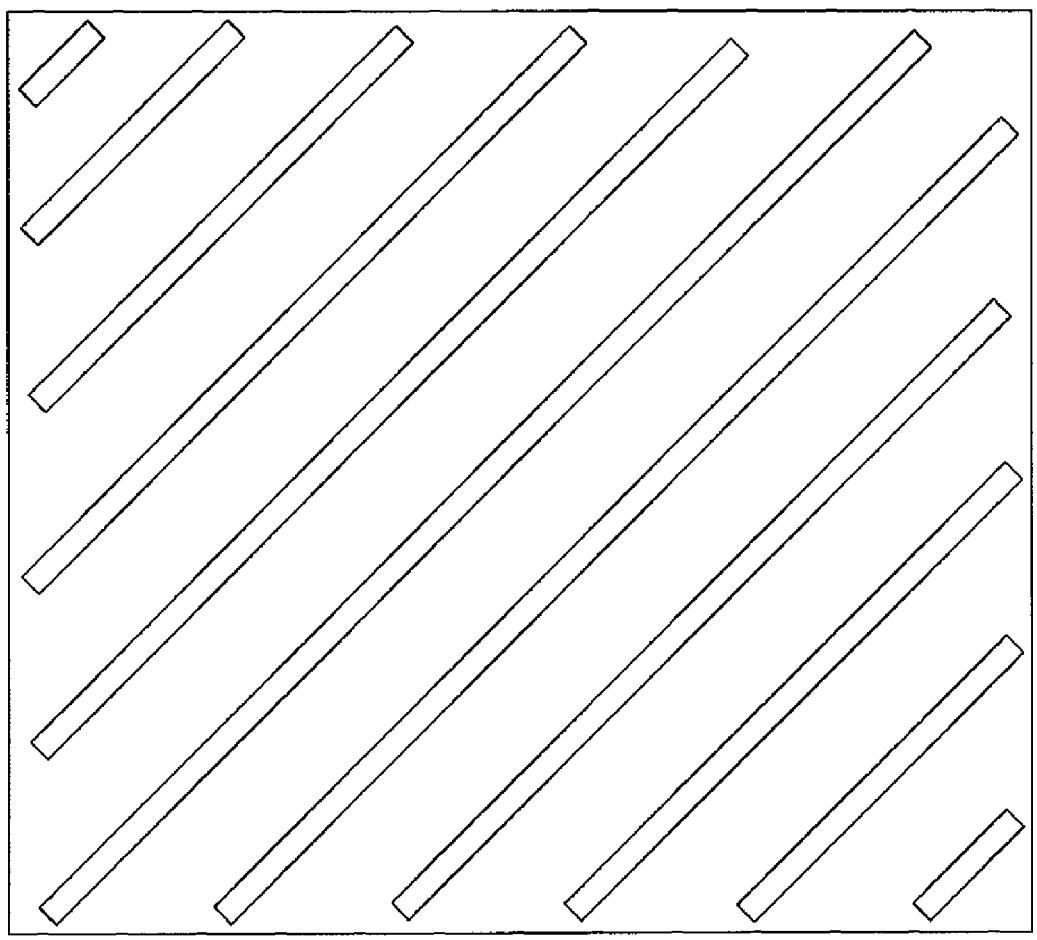
FIG. 26 is a drawing showing a pattern in which the width of small pieces of the resin-made adhesive sheet VHB is 50 mm or less to form a long and thin pattern and the number of small pieces is reduced.

Furthermore, FIG. 26 shows a pattern in which the number of small pieces is reduced as same as FIG. 25 and has an effect to reduce the manufacturing expense.

Here, if a resin-made adhesive sheet VHB having a large area is used, air bubbles tend to enter easily the glued surface. As a result, the glued area becomes small. Further, the reduction of adhesive force and the expansion of air bubbles due to a rise of temperature make the bonded area smaller, and the desired adhesive force will not be obtained. Furthermore, since the level of the bonded surface will change, flatness gets worse. In order to cope with the above problems, usually the bonding is conducted in a vacuum chamber. However, in order to bond a wide area, since a large vacuum chamber is needed, there is a demerit that the cost becomes high.

Furthermore, FIG. 27 shows seven types of patterns in which the area of the resin-made adhesive sheet VHB is made small and the small resin-made adhesive sheets VHB are arranged with some dispersion. In this way, a region in which small pieces of a resin-made adhesive sheet VHB are formed with a high density, or concretely a region where the ratio (a bonded area ratio) of the area of a bonded portion of the small resin-made adhesive sheets VHB occupied on a unit area becomes 30% or more due to a high density of small pieces of the small resin-made adhesive sheets VHB, is called a bonded region, and all of the bonded regions shown in FIG. 27 are 40 mm×60 mm. Moreover, in the seven types of patterns, the area that the adhesive is in the bonded region is different respectively. In each small piece, FIG. 27A is a drawing in which the bonded area ratio is 100%, FIG. 27B is a drawing in which the bonded area ratio is 75%, FIG. 27C is a drawing in which the bonded area ratio is 60%, FIG. 27D is a drawing in which the bonded area ratio is 40%, FIG. 27E is a drawing in which the bonded area ratio is 60%, FIG. 27F is a drawing in which the bonded area ratio is 50%, and FIG. 27G is a drawing in which the bonded area ratio is 71%.

Figure 28:
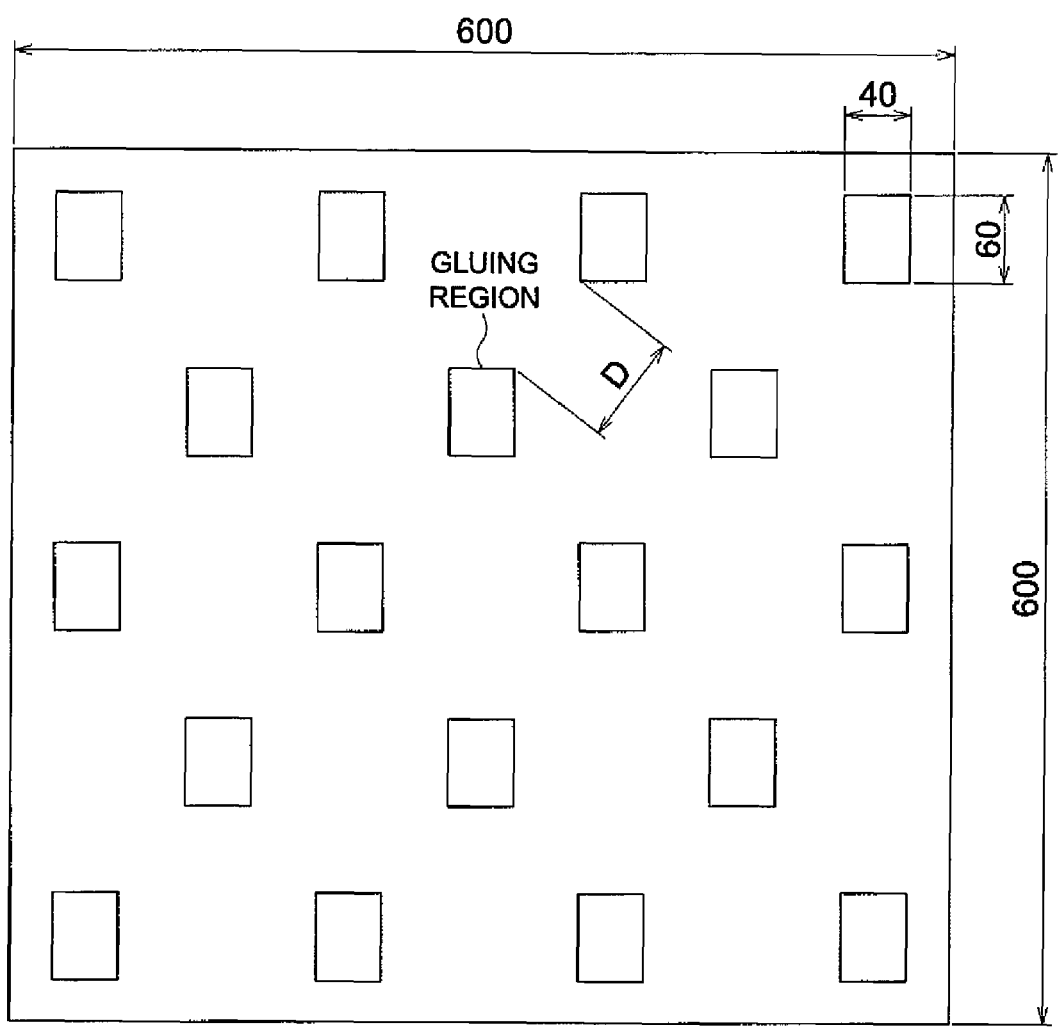
FIG. 28 is a drawing showing an example in which small pieces in the pattern shown in FIG. 27(A) are distributed.
Figure 29:
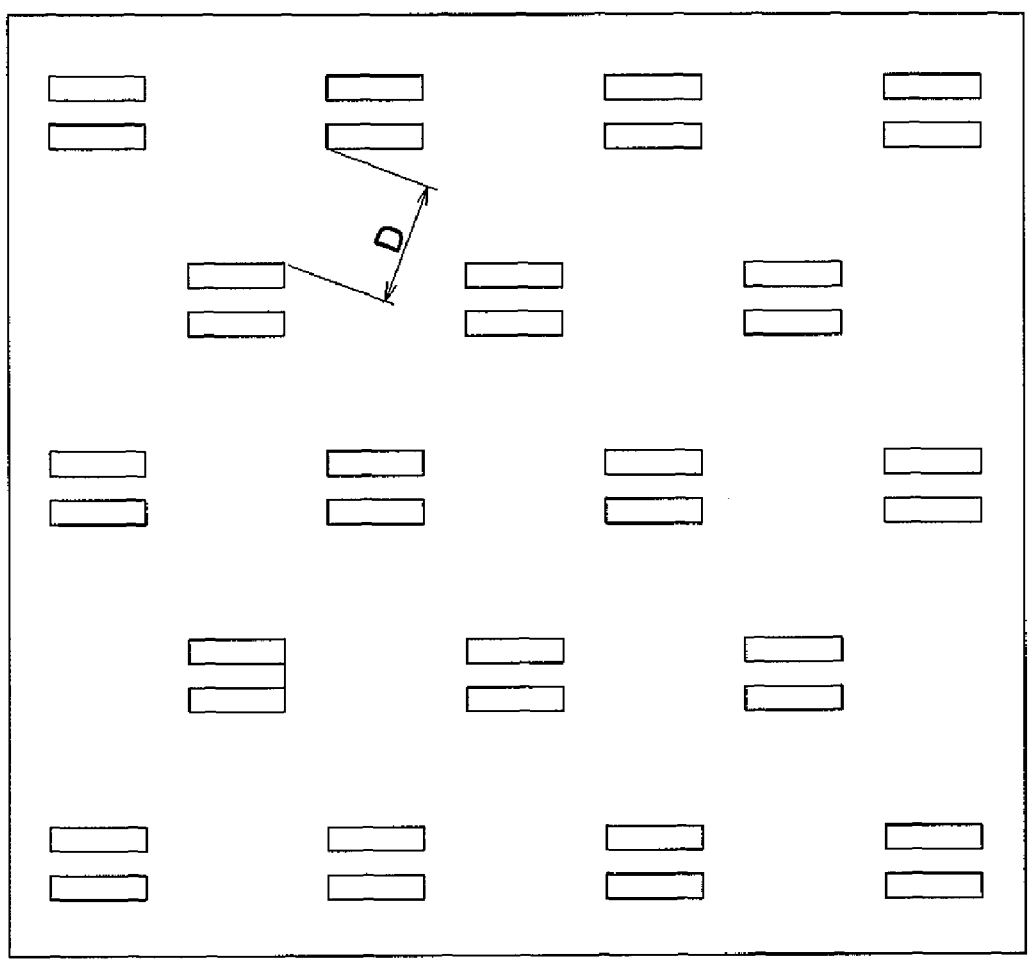
FIG. 29 is a drawing showing an example in which small pieces in the pattern shown in FIG. 27(B) are distributed.
Figure 30:
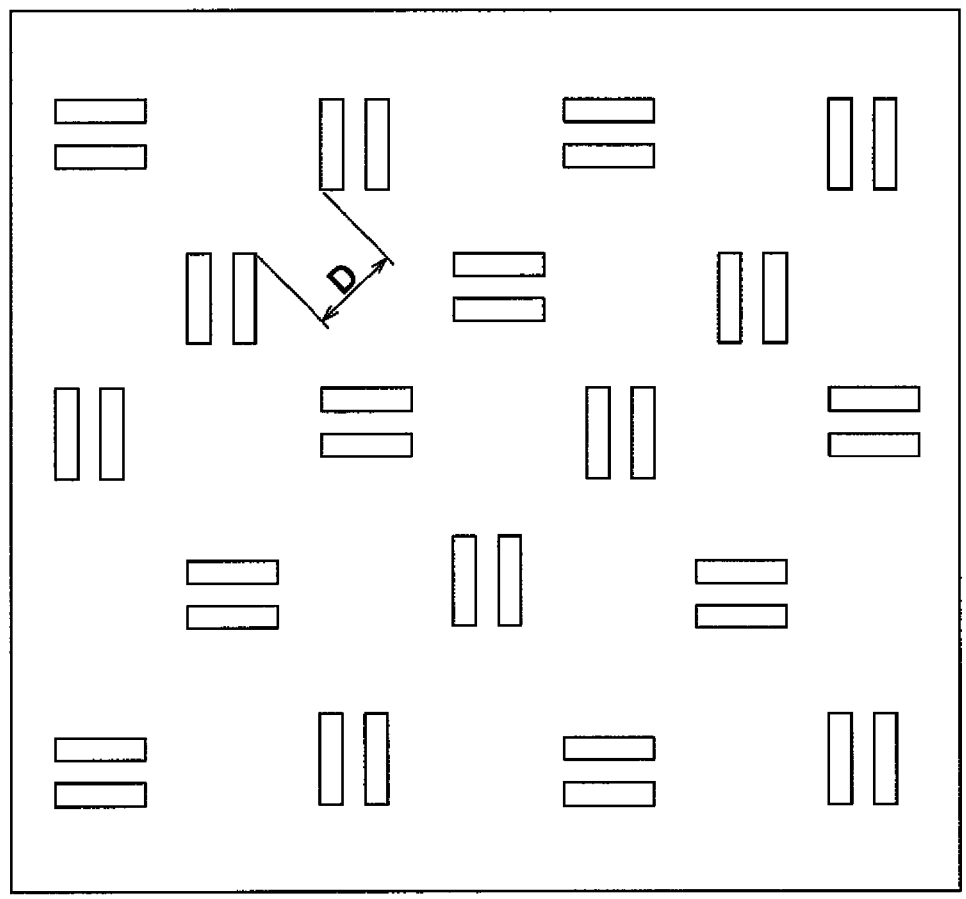
FIG. 30 is a drawing showing an example in which small pieces in the pattern shown in FIG. 27(B) are distributed.

Moreover, FIG. 28 shows an example in which the small pieces in the pattern shown in FIG. 27A are distributed, and FIGS. 29 and 30 show an example in which the small pieces in the pattern shown in FIG. 27B are distributed.

By the use of the patterns shown in FIG. 27B through FIG. 27G, when the mirror is joined to the above-mentioned surface plate, air bubbles in a bonded region tend to escape further easily, and air bubbles between the above-mentioned surface plate and the mirror are not sealed, whereby the flatness of a mirror can be secured.

Next, the above-mentioned conditional formula (1) will be explained in detail.

Figure 31:
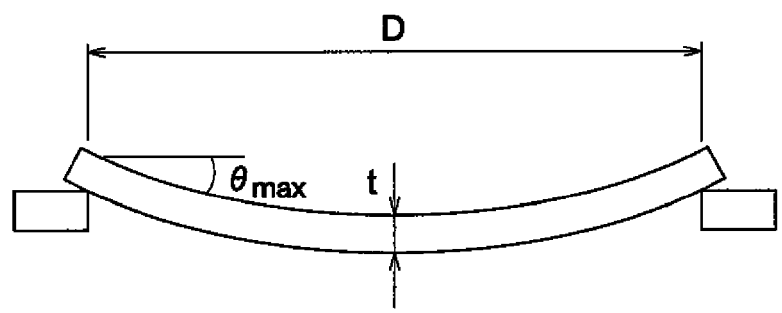
FIG. 31 is a drawing showing the maximum bending angle of the substrate supported by two neighboring resin-made adhesive sheets.

As shown in FIGS. 28, 29, and 30, the distance between two neighboring resin-made adhesive sheets VHB is set to D. As shown in FIG. 31, the bending angle of the substrate SS which is supported with the distance D becomes the maximum at supporting points, i.e., both ends, and when this angle is set to θmax, it is represented with the following formula.

$$\theta\text{max}=wD^3/24EI \qquad (8)$$

Where w represents the weight of the substrate SS per unit length in the direction along the distance, E represents the Young's modulus of the substrate SS, and I represents the secondary cross-section moments of the substrate SS.

When the specific gravity of the substrate SS is set to Sρ, thickness of the substrate SS is set to t, and the depth of the substrate SS is set to b, the weight w of the substrate SS is represented with the following formula.

$$w = S\rho tb \quad (9)$$

Further, the secondary cross-section moments I of the substrate SS is represented with the following formula.

$$I = bt^3/12 \quad (10)$$

When the formula (9) and (10) are substituted for the formula (8), θmax can be represented as follows.

$$\theta max = S\rho D^3/2Et^2 = \frac{1}{2}\{D/\sqrt[3]{(Et^2/S\rho)}\}^3$$

Figure 32:
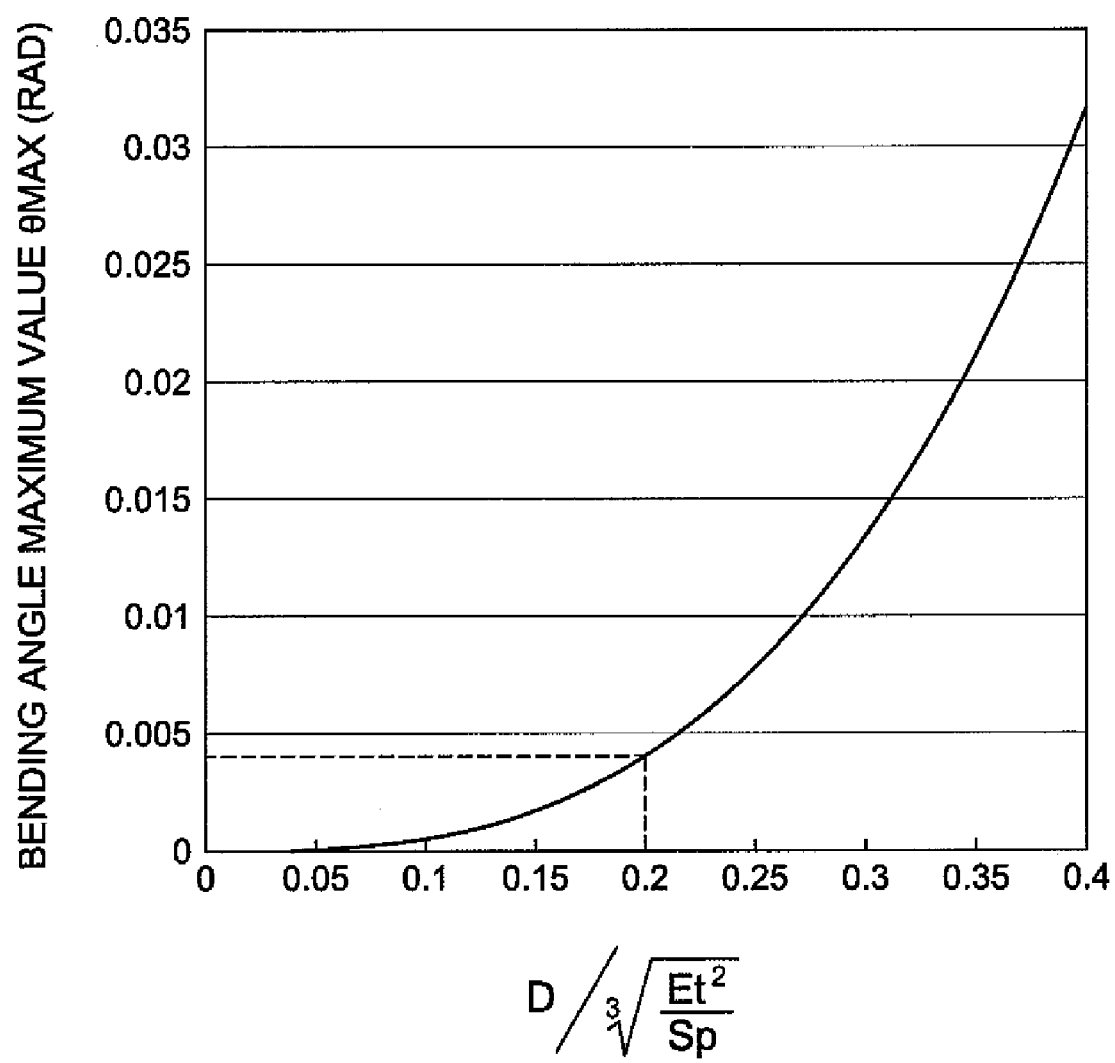
FIG. 32 is a graphic chart showing a relationship between θmax and $D/\sqrt[3]{(Et2/S\rho)}$.

As shown in FIG. 32, since θmax is proportional to the cube of D, the situation of change of θmax increases rapidly with the increase of D.

If the mirror M inclines with a bending angle θ, the angle of a reflected light on the part will deviate by 2θ. Therefore, the deviation of an arriving position of light rays at a position with the distance x from the mirror M becomes 2θx. It is desirable that the deviation of an arriving position is 1% or less. For such a purpose, it needs to make such that 2θ<0.01 radian, i.e., θ<0.005 radian.

Therefore, it is desirable that from the view point of allowance, the set-up is selected within the following range.

$$D/\sqrt[3]{(Et^2/S\rho)} < 0.2$$

Figure 33:
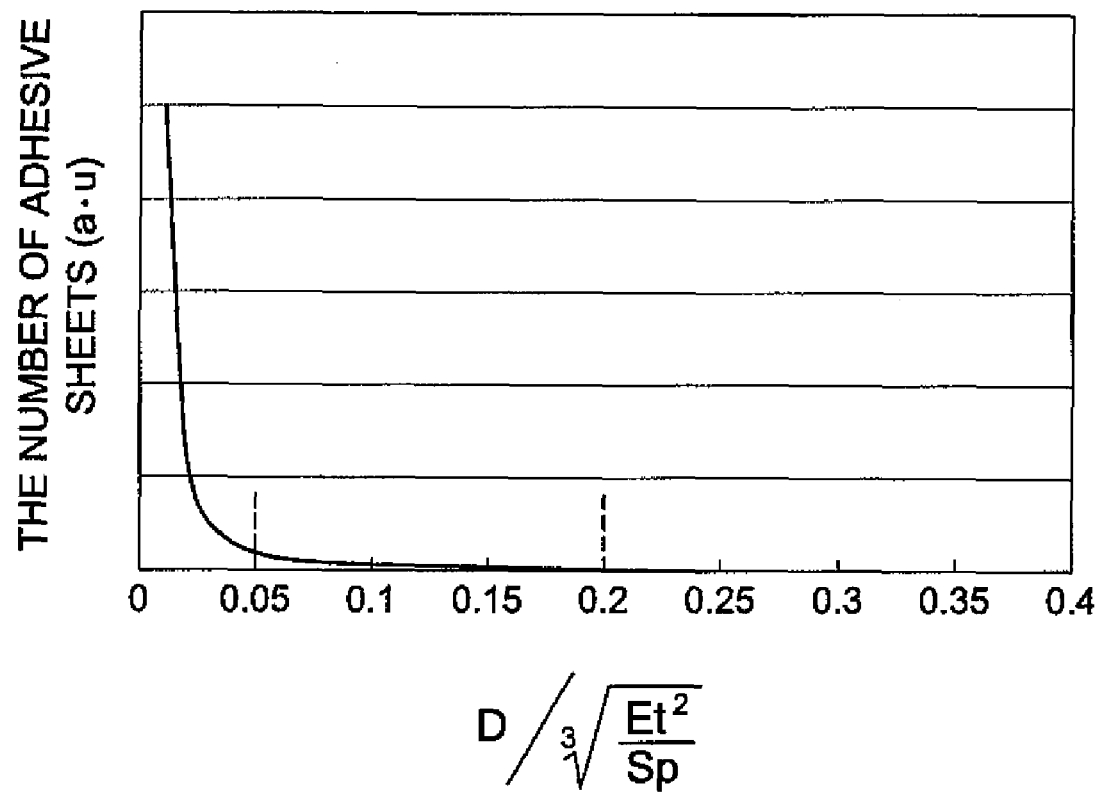
FIG. 33 is a graphic chart showing a relationship between the number of resin-made adhesive sheets and $D/\sqrt[3]{(Et^2/S\rho)}$.

On the other hand, with the assumption that resin-made adhesive sheets VHB are arranged with an isotropic distribution, if the distance D of neighboring resin-made adhesive sheets VHB is made small, as shown in FIG. 33, the number of the resin-made adhesive sheets VHB increases in inverse proportion to D2.

It is assumed that $D/\sqrt[3]{(Et^2/S\rho)} < 0.05$, for example, only with a change of from "0.05" to "0.04", the number of the resin-made adhesive sheets VHB will become 1.6 times.

Therefore, it is desirable that the set-up is made within the following conditional formula (1).

$$0.05 \times \sqrt[3]{(Et^2/S\rho)} < D < 0.2 \times \sqrt[3]{(Et^2/S\rho)} \quad (1)$$

Example 1

The film thickness data of the dielectric multilayer used suitably for a mirror in Example are shown in Table 1.

Figure 18:
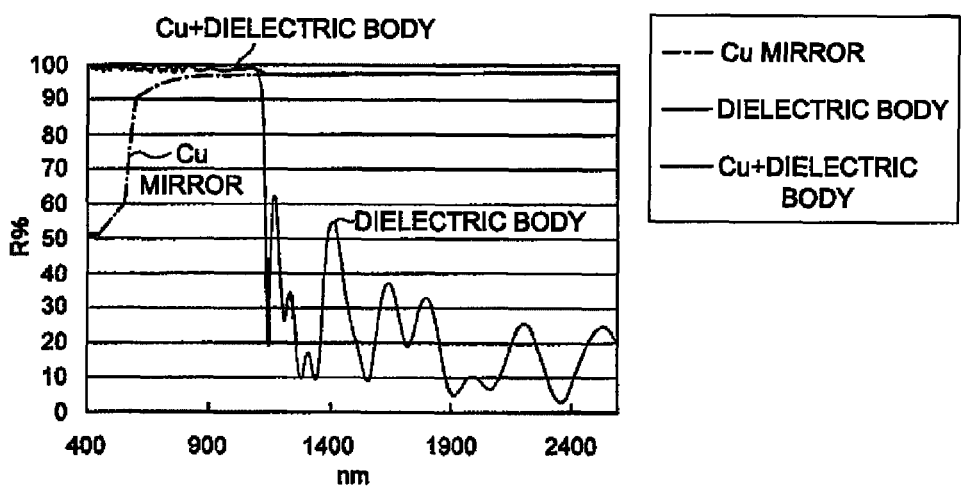
FIG. 18 is a drawing showing the reflection characteristic at the time that light was made to enter with an incident angle of 20 degrees, in the example in which a metal deposition film made from a material of Cu and the dielectric multilayer were formed.
Figure 19:
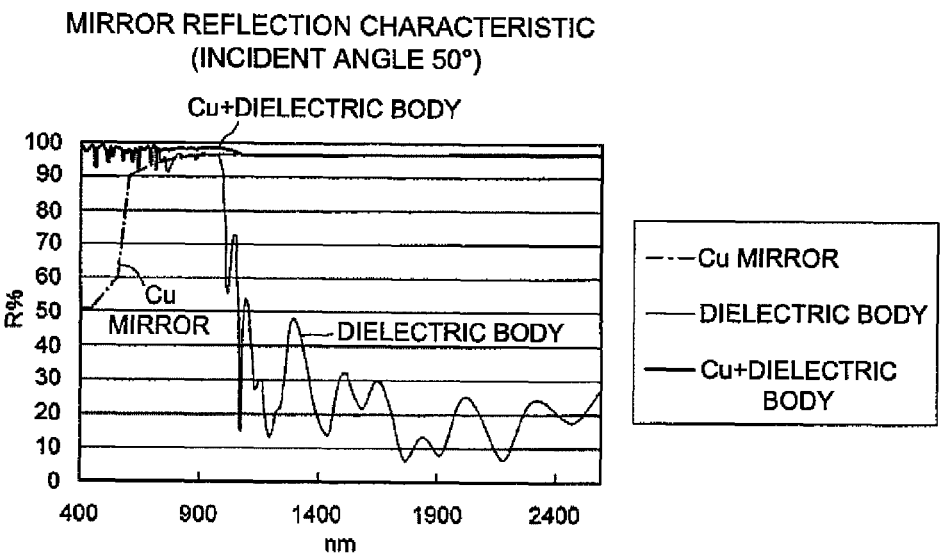
FIG. 19 is a drawing showing the reflection characteristic at the time that light was made to enter with an incident angle of 50 degrees, in the example in which a metal deposition film made from a material of Cu and the dielectric multilayer were formed.
Figure 20:
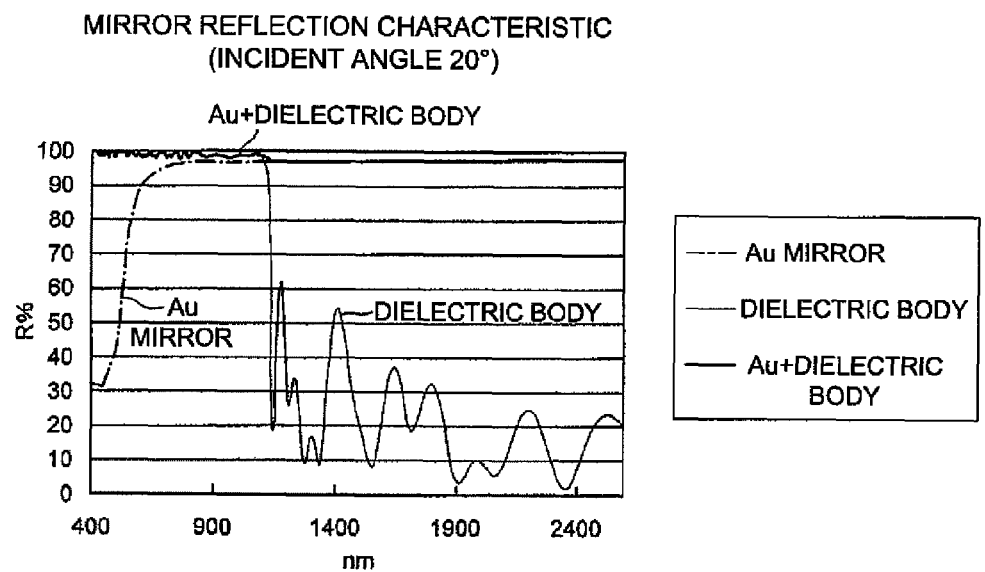
FIG. 20 is a drawing showing the reflection characteristic at the time that light was made to enter with an incident angle of 20 degrees, in the example in which a metal deposition film made from a material of Au and the dielectric multilayer were formed.
Figure 21:
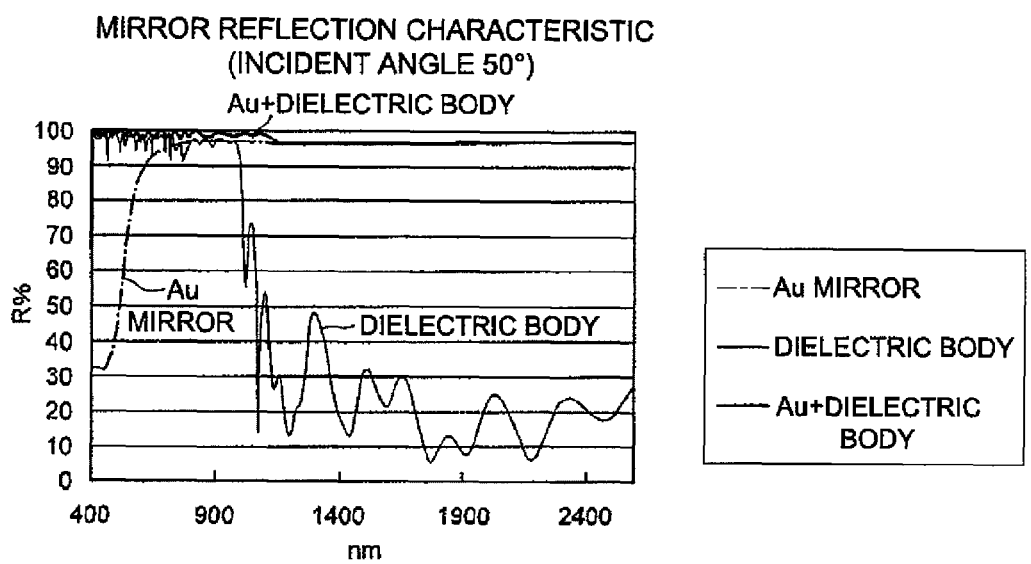
FIG. 21 is a drawing showing the reflection characteristic at the time that light was made to enter with an incident angle of 50 degrees, in the example in which a metal deposition film made from a material of Au and the dielectric multilayer were formed.
Figure 22:
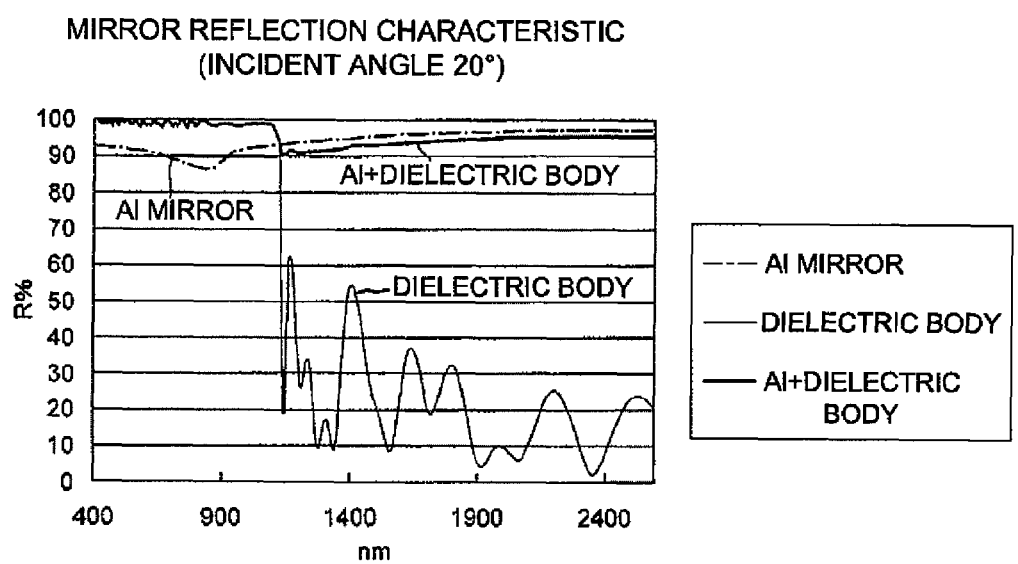
FIG. 22 is a drawing showing the reflection characteristic at the time that light was made to enter with an incident angle of 20 degrees, in the example in which a metal deposition film made from a material of Al and the dielectric multilayer were formed.
Figure 23:
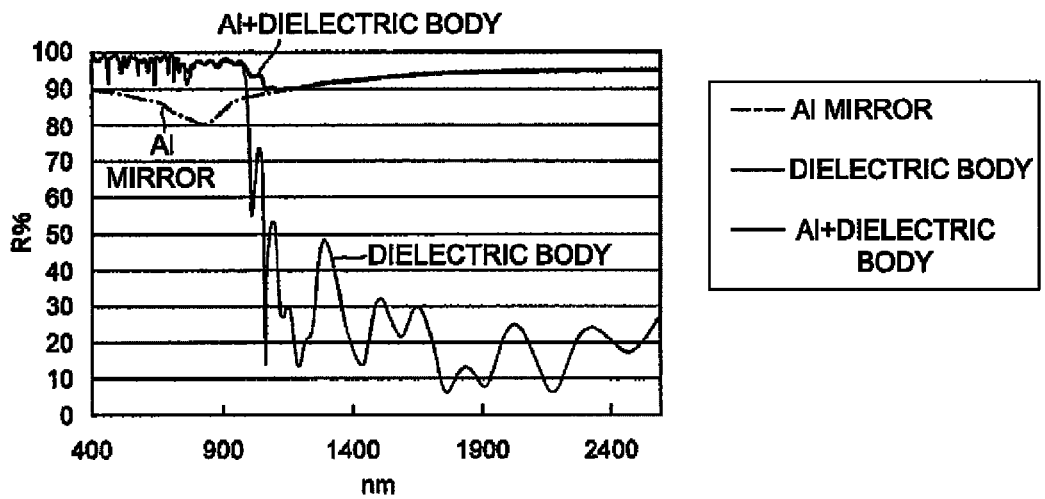
FIG. 23 is a drawing showing the reflection characteristic at the time that light was made to enter with an incident angle of 50 degrees, in the example in which a metal deposition film made from a material of Al and the dielectric multilayer were formed.

In the example in which the dielectric multilayer shown in Table 1 was formed on an incidence plane of a glass-made substrate and a metal deposition film made from a material of Cu was formed on a plane of the substrate at the opposite side to the incidence plane, FIG. 18 is a drawing showing the reflection characteristic at the time that light was made to enter with an incident angle of 20 degrees. In the same example, FIG. 19 is a drawing showing the reflection characteristic at the time that light was made to enter with an incident angle of 50 degrees. In the example in which the dielectric multilayer shown in Table 1 was formed on an incidence plane of a glass-made substrate and a metal deposition film made from a material of Au was formed on a plane of the substrate at the opposite side to the incidence plane, FIG. 20 is a drawing showing the reflection characteristic at the time that light was made to enter with an incident angle of 20 degrees. In the same example, FIG. 21 is a drawing showing the reflection characteristic at the time that light was made to enter with an incident angle of 50 degrees. In the example in which the dielectric multilayer shown in Table 1 was formed on an incidence plane of a glass-made substrate and a metal deposition film made from a material of Al was formed on a plane of the substrate at the opposite side to the incidence plane, FIG. 22 is a drawing showing the reflection characteristic at the time that light was made to enter with an incident angle of 20 degrees. In the same example, FIG. 23 is a drawing showing the reflection characteristic at the time that light was made to enter with an incident angle of 50 degrees. In the example in which the dielectric multilayer and the Al metal deposition film were combined, an average reflectance ratio was 95% or more when the wavelength of incident light was in a range of 400 to 1000 nm, and in a long wavelength region of 1000 to 2000 nm, the average reflectance ratio was 90% or more. In the other examples, with the combination of the dielectric multilayer and the metal deposition film, the average reflectance ratio of 95% or more was able to be obtained in a wide range of 400 to 2000 nm in wavelength of incident light.

TABLE 1

Layer configuration in a dielectric layer

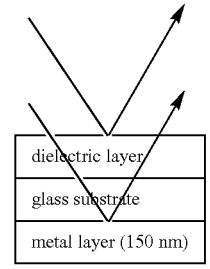

| | Glass | (nm) |
|---|---|---|
| 1 | TIO2 | 85.58 |
| 2 | SIO2 | 154.21 |
| 3 | TIO2 | 90.44 |
| 4 | SIO2 | 190.02 |
| 5 | TIO2 | 105.43 |
| 6 | SIO2 | 164.45 |
| 7 | TIO2 | 87.39 |
| 8 | SIO2 | 215.1 |
| 9 | TIO2 | 99.68 |
| 10 | SIO2 | 151.58 |
| 11 | TIO2 | 114.96 |
| 12 | SIO2 | 148.02 |
| 13 | TIO2 | 80.5 |
| 14 | SIO2 | 136.27 |
| 15 | TIO2 | 61.79 |
| 16 | SIO2 | 94.62 |
| 17 | TIO2 | 66.65 |
| 18 | SIO2 | 122.13 |
| 19 | TIO2 | 25.09 |
| 20 | SIO2 | 90.47 |
| 21 | TIO2 | 74.51 |
| 22 | SIO2 | 140.79 |
| 23 | TIO2 | 72.49 |
| 24 | SIO2 | 112.93 |
| 25 | TIO2 | 71.26 |
| 26 | SIO2 | 116.06 |
| 27 | TIO2 | 78.12 |
| 28 | SIO2 | 116.27 |
| 29 | TIO2 | 133.48 |
| 30 | SIO2 | 86.5 |
| 31 | TIO2 | 53.86 |
| 32 | SIO2 | 109.19 |
| 33 | TIO2 | 63.7 |
| 34 | SIO2 | 90.45 |
| 35 | TIO2 | 34.73 |
| 36 | SIO2 | 93.88 |
| 37 | TIO2 | 52.85 |
| 38 | SIO2 | 67.08 |
| 39 | TIO2 | 46.52 |
| 40 | SIO2 | 86.74 |
| 41 | TIO2 | 303.15 |

TABLE 1-continued

| | | |
|---|---|---|
| 42 | SIO2 | 57.54 |
| 43 | TIO2 | 52.91 |
| 44 | SIO2 | 199.56 |
| 45 | TIO2 | 62.39 |
| 46 | SIO2 | 66.77 |
| 47 | TIO2 | 32.86 |
| 48 | SIO2 | 81.96 |
| 49 | TIO2 | 30.51 |
| 50 | SIO2 | 95.01 |
| 51 | TIO2 | 97.76 |
| 52 | SIO2 | 161.82 |
| | Air | |

Example 2

Figure 24:
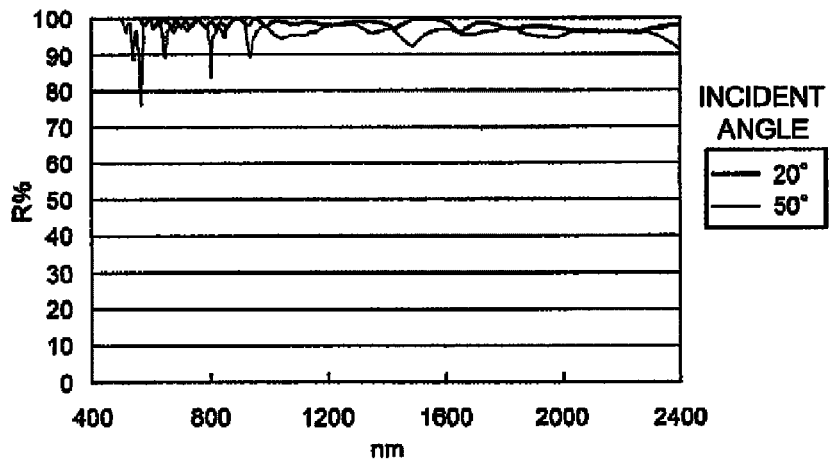
FIG. 24 is a drawing showing the reflection characteristic at the time that light was made to enter with an incident angle of 20 degrees and 50 degrees, in the example in which the dielectric multilayer with 37 layers were formed.

The film thickness data of the dielectric multilayer used suitably for a mirror in Example are shown in Table 2. In the case where the dielectric multilayer of the example and the comparative example shown in Table 2 was formed on an incidence plane of a glass substrate, FIG. 24 is a drawing showing a reflection characteristic at the time that light was made to enter with an incidence angle of 20 degrees and an incidence angle of 50 degrees. As is clear from FIG. 24, in the case that the dielectric multilayer of the example is used, it has the average reflectance of 95% or more over a wide range of 400 to 2000 nm. Here, in the dielectric multilayer of the example, a high refraction index layer (Si) has a refraction index of 4.06 to 3.53 for an incident light with a wavelength in a range of 0.8 μm to 2.4 μm, and a low refraction index layer (SiO$_2$) has a refraction index of 1.45 to 1.43 for an incident light with a wavelength in a range of 0.8 μm to 2.4 μm.

TABLE 2

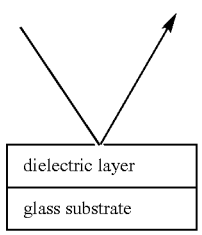

Layer configuration in a dielectric layer

| | Glass | (nm) |
|---|---|---|
| 1 | SIO2 | 473.87 |
| 2 | SI | 2.54 |
| 3 | SIO2 | 231.96 |
| 4 | SI | 8.29 |
| 5 | SIO2 | 336.04 |
| 6 | SI | 22.55 |
| 7 | SIO2 | 103.33 |
| 8 | SI | 30.02 |
| 9 | SIO2 | 53.81 |
| 10 | SI | 26.07 |
| 11 | SIO2 | 123.31 |
| 12 | SI | 19.28 |
| 13 | SIO2 | 74.11 |
| 14 | SI | 39.98 |
| 15 | SIO2 | 116.36 |
| 16 | SI | 9.91 |
| 17 | SIO2 | 94.5 |
| 18 | SI | 45.21 |
| 19 | SIO2 | 101.7 |
| 20 | SI | 37.78 |
| 21 | SIO2 | 30.65 |
| 22 | SI | 40.43 |
| 23 | SIO2 | 105.13 |

TABLE 2-continued

| | | |
|---|---|---|
| 24 | SI | 124.12 |
| 25 | SIO2 | 148.18 |
| 26 | SI | 76.18 |
| 27 | SIO2 | 200.26 |
| 28 | SI | 151.81 |
| 29 | SIO2 | 121.88 |
| 30 | SI | 65.01 |
| 31 | SIO2 | 367.08 |
| 32 | SI | 119.46 |
| 33 | SIO2 | 393.92 |
| 34 | SI | 159.67 |
| 35 | SIO2 | 294.97 |
| 36 | SI | 154.75 |
| 37 | SIO2 | 396.44 |
| | Air | |

As mentioned above, although the present invention has been explained with reference to embodiments, it should not be interpreted that the present invention is limited to the above-mentioned embodiments, and it is clear that modification and improvement can be made suitably.

| EXPLANATION OF REFERENCE SYMBOLS | |
|---|---|
| 1 | Condensing Mirror |
| 2 | Supporting Tower |
| 3 | Heat Exchange Facility |
| 4 | Condensing Mirror |
| 5 | Heliostat |
| 6 | Supporting Pole |
| 7 | Fork |
| 8 | Ring-shaped Rail |
| 9 | Rotating Pulley |
| 10 | Pressing Pulley |
| 11 | Motor |
| 12 | Timing Belt |
| 13 | Concave Mirror |
| 14 | Circular Pipe |
| 15 | Rotating Shaft |
| 16 | Circular Rail |
| 17 | Rotating Pulley |
| 18 | Pressing Pulley |
| 19 | Power Pulley |
| 20 | Motor |
| 21 | Timing Belt |
| 22 | Arm |
| 23 | Sensor |
| 31 | Lower Opening |
| HC | Honeycomb core |
| L | Sunlight |
| M | Mirror |
| OS | Mirror Structure |
| PT1, PT2 | Surface Plate |
| SS | Substrate |
| VHB | Resin-made adhesive Tape |

The invention claimed is:
1. A mirror structure to be used under an environment that the maximum irradiance of incident light is 5 kW/m$^2$ or more, comprising:
a mirror having an area of 0.2 m$^2$ or more;
a supporting member to support the mirror; and
a resin-made adhesive sheet to glue the mirror to the supporting member;
wherein the mirror comprises a plate-shaped substrate, and a dielectric multilayer formed on at least an incident light side surface of the substrate and the mirror has an average reflectance ratio of 95% or more for incident light having a wavelength in a range of 400 to 1000 nm, and
wherein the resin-made adhesive sheet includes plural resin-made adhesive sheets arranged in a discrete arrangement on the supporting member so as to form plural gluing regions, and wherein when a shortest distance between two neighboring gluing regions among the plural gluing regions is D, a specific gravity of the substrate is S$\rho$, a Young's modulus of the substrate is E, and a thickness of the substrate is t, the following conditional formula is satisfied:

$$0.05 \times \sqrt[3]{(Et^2/S\rho)} < D < 0.2 \times \sqrt[3]{(Et2/S\rho)}.$$

2. The mirror structure described in claim 1, wherein a heatproof temperature of the resin-made adhesive sheet is 120° C. to 200° C.

3. The mirror structure described in claim 1, wherein in a case that a fracture elongation rate of the resin-made adhesive sheet is 400% or more and the supporting member comprises a surface plate, when a linear expansion coefficient of the surface plate is A, a linear expansion coefficient of the substrate is B and a thickness of the resin-made adhesive sheet is $\tau$, the following formula is satisfied $$10 \times 10^{-6}/K < A < 20 \times 10^{-6}/K \quad (2)$$

$$3 \times 10^{-6}/K < B < 9 \times 10^{-6}/K \quad (3)$$

$$0.3(mm) < \tau < 2.0(mm) \quad (4).$$

4. The mirror structure described in claim 3, wherein the linear expansion coefficient of the surface plate is smaller than $12 \times 10^{-6}$/K, and the linear expansion coefficient of the substrate is larger than $3 \times 10^{-6}$/K.

5. The mirror structure described in claim 1, wherein when the mirror is looked from a direction of incident light, the mirror covers an entire body of the supporting member.

6. The mirror structure described in claim 1, wherein the resin-made adhesive sheet glues the mirror to the supporting member at plural gluing portions, and wherein the plural gluing portions are distributed such that an area of the plural gluing portions is 5% to 20% of the total area of the mirror and a smaller width of one of the plural gluing portions is 50 mm or less.

7. The mirror structure described in claim 1, wherein the resin-made adhesive sheet is an acrylics foam double-face adhesive tape.

8. The mirror structure described in claim 1, wherein the mirror comprises a glass-made substrate with a thickness of 0.5 mm or more.

9. The mirror structure described in claim 1, wherein the supporting member comprises a honeycomb core and a surface plate fixed to the honeycomb core, and the surface plate is made of stainless steel.

10. The mirror structure described in claim 1, wherein the following conditional formulas are satisfied, $$0.5(g/cm^3) < \rho < 1(g/cm^3)$$

$$0.01 < t^3/W\min^2 < 0.05$$

where Wmin represents a width of a minimum portion of the mirror, t represents a thickness of the supporting member, and $\rho(g/cm^3)$ represents an average density of the supporting member.

11. The mirror structure described in claim 1, wherein the following conditional formula is satisfied, $$100 < \tau/(W\max \cdot \Delta\beta) < 500$$

where Wmax represents a width of a minimum portion of the mirror, $\Delta\beta$ represents a difference in linear expansion coefficient between the surface plate and the substrate member, and $\tau$ represents a thickness of the resin-made adhesive sheet.

12. A mirror structure to be used under an environment that the maximum irradiance of incident light is 5 kW/m² or more, comprising:

a mirror having an area of 0.2 m² or more;

a supporting member to support the mirror; and a resin-made adhesive sheet to glue the mirror to the supporting member;

wherein the mirror comprises a plate-shaped substrate, and a dielectric multilayer formed on at least an incident light side surface of the substrate and the mirror has an average reflectance ratio of 95% or more for incident light having a wavelength in a range of 400 to 1000 nm, and wherein the resin-made adhesive sheet glues the mirror to the supporting member at plural gluing portions, and wherein the plural gluing portions are distributed such that an area of the plural gluing portions is 5% to 20% of the total area of the mirror and a smaller width of one of the plural gluing portions is 50 mm or less.

13. The mirror structure described in claim 12, wherein a heatproof temperature of the resin-made adhesive sheet is 120° C. to 200° C.

14. The mirror structure described in claim 12, wherein the resin-made adhesive sheet is an acrylics foam double-face adhesive tape.

15. The mirror structure described in claim 12, wherein the mirror comprises a glass-made substrate with a thickness of 0.5 mm or more.

16. The mirror structure described in claim 12, wherein the supporting member comprises a honeycomb core and a surface plate fixed to the honeycomb core, and the surface plate is made of stainless steel.

17. A mirror structure to be used under an environment that the maximum irradiance of incident light is 5 kW/m² or more, comprising:

a mirror having an area of 0.2 m² or more;

a supporting member to support the mirror; and a resin-made adhesive sheet to glue the mirror to the supporting member;

wherein the mirror comprises a plate-shaped substrate, and a dielectric multilayer formed on at least an incident light side surface of the substrate and the mirror has an average reflectance ratio of 95% or more for incident light having a wavelength in a range of 400 to 1000 nm, and wherein in a case that a fracture elongation rate of the resin-made adhesive sheet is 400% or more and the supporting member comprises a surface plate, when a linear expansion coefficient of the surface plate is A, a linear expansion coefficient of the substrate is B and a thickness of the resin-made adhesive sheet is $\tau$, the following formula is satisfied.

$$10 \times 10^{-6}/K < A < 20 \times 10^{-6}/K$$

$$3 \times 10^{-6}/K < B < 9 \times 10^{-6}/K$$

$$0.3(mm) < \tau < 2.0(mm)$$

18. The mirror structure described in claim 17, wherein the linear expansion coefficient of the surface plate is smaller than $12 \times 10^{-6}$/K, and the linear expansion coefficient of the substrate is larger than $3 \times 10^{-6}$/K.

\* \* \* \* \*